(12) United States Patent
Chen et al.

(10) Patent No.: US 10,755,456 B2
(45) Date of Patent: Aug. 25, 2020

(54) METHOD AND APPARATUS FOR DISPLAYING INFORMATION OF MULTIPLE OBJECTS

(71) Applicants: Industrial Technology Research Institute, Hsinchu (TW); Intellectual Property Innovation Corporation, Hsinchu (TW)

(72) Inventors: Jian-Lung Chen, Taoyuan (TW); Chih-Chia Chang, Hsinchu County (TW); Yu-Hsin Lin, Miaoli County (TW)

(73) Assignees: Industrial Technology Research Institute, Hsinchu (TW); Intellectual Property Innovation Corporation, Hsinchu (TW)

(*) Notice: Subject to any disclaimer, the term of this patent is extended or adjusted under 35 U.S.C. 154(b) by 0 days.

(21) Appl. No.: 16/243,090

(22) Filed: Jan. 9, 2019

(65) Prior Publication Data
US 2020/0082581 A1 Mar. 12, 2020

(30) Foreign Application Priority Data
Sep. 7, 2018 (TW) .............................. 107131495 A

(51) Int. Cl.
*G06T 11/20* (2006.01)
*G06T 11/60* (2006.01)

(52) U.S. Cl.
CPC .............. *G06T 11/20* (2013.01); *G06T 11/60* (2013.01)

(58) Field of Classification Search
CPC .............................. G06T 11/60; G06T 19/006
See application file for complete search history.

(56) References Cited

U.S. PATENT DOCUMENTS

| 8,466,894 | B2 | 6/2013 | Sugita et al. |
| 9,317,113 | B1 | 4/2016 | Karakotsios et al. |
| 9,844,468 | B2 | 12/2017 | Boncyk et al. |
| 10,002,442 | B1* | 6/2018 | Dagley ................. G06T 19/006 |
| 2012/0072873 | A1 | 3/2012 | Park et al. |

(Continued)

FOREIGN PATENT DOCUMENTS

| CN | 107025683 | | 8/2017 |
| CN | 107025683 | A * | 8/2017 |

(Continued)

OTHER PUBLICATIONS

"Office Action of Taiwan Counterpart Application", dated Jun. 28, 2019, p. 1-p. 9.

*Primary Examiner* — Jeffery A Brier
(74) *Attorney, Agent, or Firm* — JCIPRNET

(57) ABSTRACT

A method and an apparatus for displaying information of multiple objects are provided. The method includes following steps: capturing an image within a sight of a user viewing a transparent display; identifying multiple objects in the image to generate multiple identification frames capable of covering the objects, respectively; generating an auxiliary bonding box capable of covering the identification frames; defining an information display area according to non-overlapping areas of the auxiliary bonding box and the identification frames; and group displaying object information of the objects in the information display area on the transparent display.

20 Claims, 17 Drawing Sheets

(56) References Cited

U.S. PATENT DOCUMENTS

| | | | |
|---|---|---|---|
| 2012/0075343 A1* | 3/2012 | Chen | G09G 5/397 |
| | | | 345/633 |
| 2014/0285521 A1 | 9/2014 | Kimura | |
| 2016/0034042 A1 | 2/2016 | Joo | |
| 2018/0144552 A1* | 5/2018 | Ishikawa | G06F 3/0481 |
| 2018/0232942 A1 | 8/2018 | Wang et al. | |
| 2018/0341811 A1* | 11/2018 | Bendale | G06T 7/593 |

FOREIGN PATENT DOCUMENTS

| | | |
|---|---|---|
| CN | 103581618 | 1/2018 |
| CN | 107615227 | 1/2018 |
| TW | 201132936 | 10/2011 |
| TW | 201432594 | 8/2014 |
| TW | 201734712 | 10/2017 |

\* cited by examiner

METHOD AND APPARATUS FOR DISPLAYING INFORMATION OF MULTIPLE OBJECTS

CROSS REFERENCE TO RELATED APPLICATION

This application claims the priority benefit of a Taiwan application serial no. 107131495, filed on Sep. 7, 2018. The entirety of the above-mentioned patent application is hereby incorporated by reference herein.

BACKGROUND

Technical Field

The disclosure relates to a method and an apparatus for displaying information, and also relates to a method and an apparatus for displaying information of multiple objects.

Description of Related Art

Based on the technical principles, transparent displays may be divided into see-through transparent displays and projection transparent displays. In a see-through transparent display, the display panel is manufactured to be transparent, and in a projection transparent display, the image is projected through a projection method onto a substrate having reflective and transparent properties to achieve the transparent display effect.

The transparent display has the characteristics of transparency, lightness, thinness, etc., the image displayed on the display may combine with real-world scenes and offer a viewer an intuitive and instinctive interactive experience. The viewer may not only see the real object through the transparent display, but may also see the information superimposed on or displayed around the real object on the transparent display, or even interact with the displayed information on the transparent display through touch technologies.

Transparent displays have been widely used in applications such as car head-up displays, vending machines, merchandise windows, museum exhibits, and sightseeing vehicle tours. For applications having high strong demand for external object identification (such as aquarium guided tours), with multiple objects, if the information is individually displayed for each object, it is likely to cause problem of disorderly display of the object information and difficulty in reading.

SUMMARY

An embodiment of the disclosure provides a method for displaying information of multiple objects. The method includes steps below. An image within a sight of a user viewing a transparent display is captured. Multiple objects in the image are identified to generate multiple identification frames capable of covering the objects, respectively. An auxiliary bonding box capable of covering the identification frames is generated. An information display area is defined according to non-overlapping areas of the auxiliary bonding box and the identification frames. Object information of the objects is group displayed in the information display area on the transparent display.

An embodiment of the disclosure provides an apparatus for displaying information of multiple objects, including a transparent display, a first information capturing device, a second information capturing device, a storage device, and a processor. The first information capturing device is configured to capture an internal image including a user viewing the transparent display. The second information capturing device is configured to capture an external image of the transparent display on another side with respect to the user. The storage device is configured to store image data of the internal image and the external image captured by the first information capturing device and the second information capturing device and record a program or a command. The processor is coupled to the transparent display, the first information capturing device, the second information capturing device, and the storage device and is configured to load and execute the program or the command recorded in the storage device to: determine a sight of the user viewing the transparent display according to the internal image and capture an image in the external image within the sight; identify multiple objects in the image to generate multiple identification frames capable of covering the objects, respectively; generate an auxiliary bonding box capable of covering the identification frames; define an information display area according to non-overlapping areas of the auxiliary bonding box and the identification frames; and group display object information of the objects in the information display area on the transparent display.

To provide a further understanding of the disclosure, exemplary embodiments, together with the reference drawings, are described in detail below.

DESCRIPTION OF THE EMBODIMENTS

An embodiment of the disclosure is related to the case where there are multiple objects on one side of a transparent display, and according to information including the distance between a user and the transparent display, the sizes of the objects, the distribution of the objects, the moving speed of the objects, and the categories of the objects, an information display area for displaying object information and display content are defined, and the object information is group displayed in the information display area, thereby optimizing the display information and improving the reading comfort of the user.

Figure 1A:
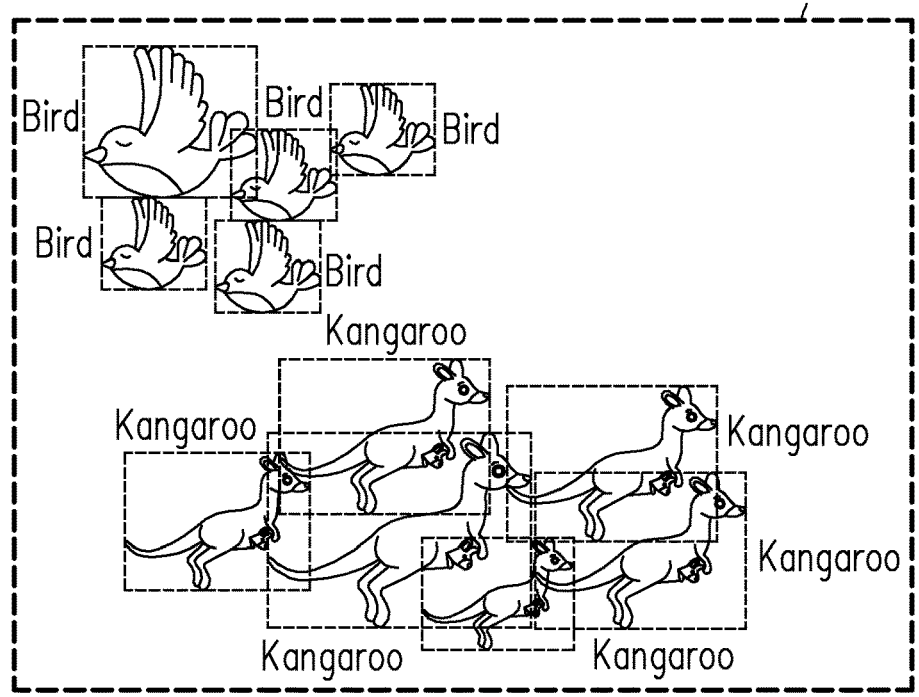
FIG. 1A and FIG. 1B are schematic diagrams of multiple object information display according to an embodiment of the disclosure.
Figure 1B:
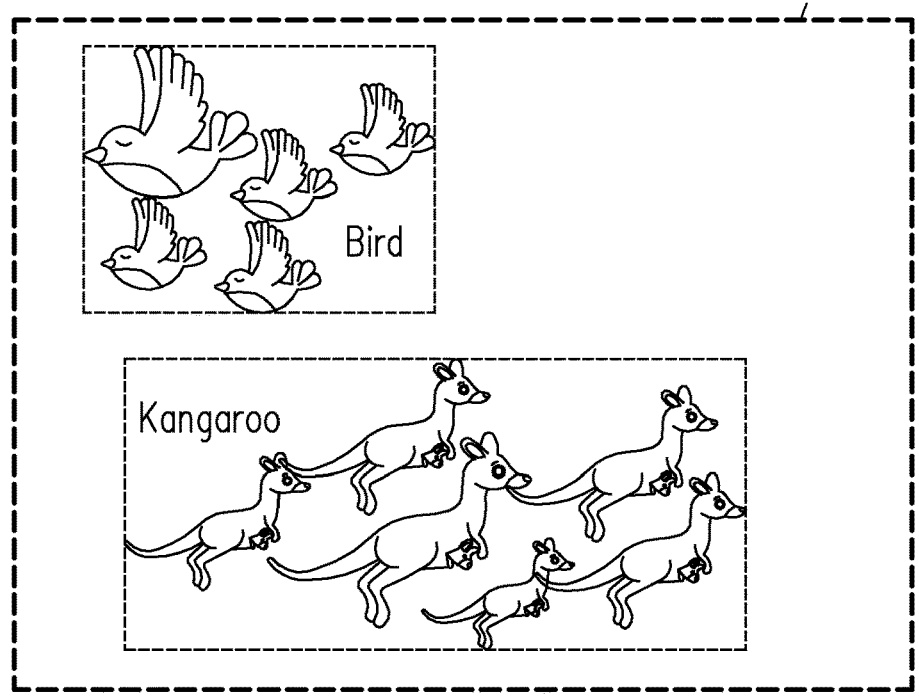

FIG. 1A and FIG. 1B are schematic diagrams of multiple object information display according to an embodiment of the disclosure. FIG. 1A illustrates an image 12 viewed by a user when the transparent display individually displays an object information for a plurality of objects. The plurality of objects (5 birds and 7 kangaroos) are close to each other and the number is large, and the individually displayed object information appears messy and is difficult for the user to read. FIG. 1B illustrates an image 14 that the user sees after the object information is group displayed by using a method for displaying information of multiple objects according to an embodiment of the disclosure. By group displaying the object information of the objects of the same category at a suitable position around the objects, the amount of the displayed information may be effectively reduced, and the displayed information is easy for the user to read.

Figure 2:
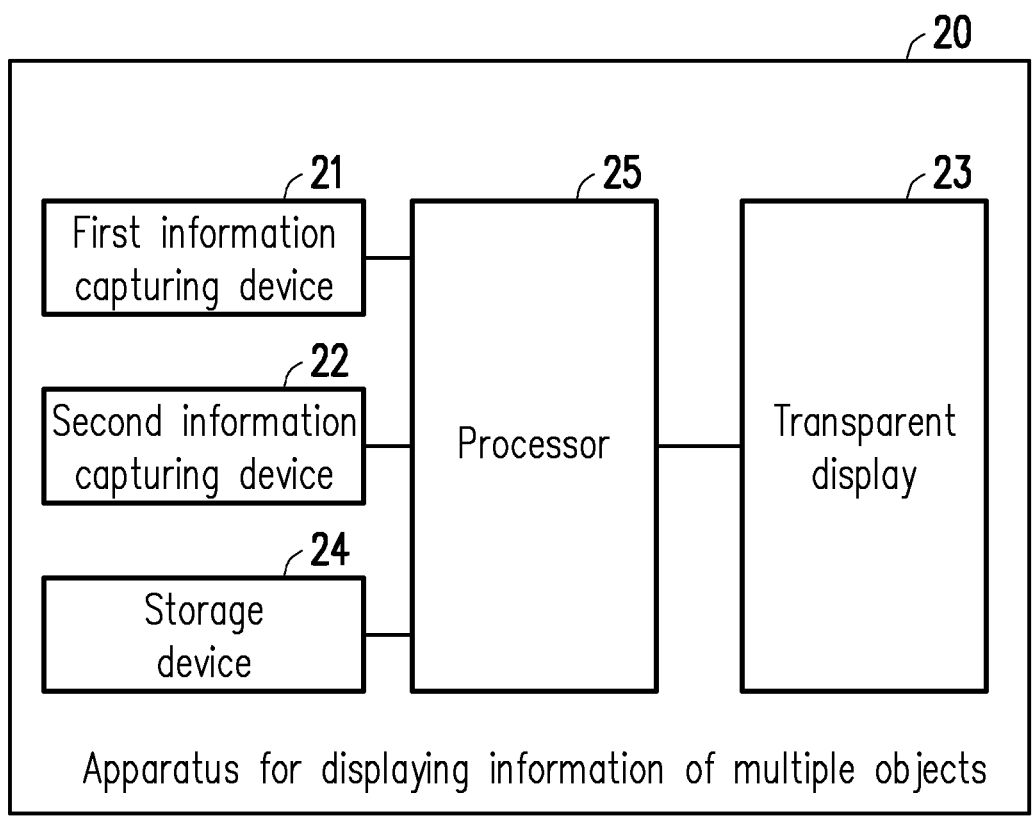
FIG. 2 is a block diagram of an apparatus for displaying information of multiple objects according to an embodiment of the disclosure.

FIG. 2 is a block diagram of an apparatus for displaying information of multiple objects according to an embodiment of the disclosure. Referring to FIG. 2, a multiple objects information display apparatus 20 of the embodiment is, for example, an electronic apparatus having a transparent display function and including a first information capturing device 21, a second information capturing device 22, a transparent display 23, a storage device 24, and a processor 25, the functions of which are described as follows.

The first information capturing device 21 and the second information capturing device 22 respectively include a camera lens and an image sensor. The camera lens may be formed of a plurality of concave-convex lenses and may be driven by an actuator such as a stepping motor or a voice coil motor to change the relative position between the lenses to thereby change the focal length of the camera lens such that the photographed object can be imaged on the image sensor. The image sensor is provided with a charge coupled device (CCD), a complementary metal-oxide semiconductor (CMOS) device, or a photosensitive device of another type and may sense the intensity of light entering the camera lens to thereby capture an image signal to generate and output an image. In the embodiment, the first information capturing device 21 is configured to capture an internal image including the user viewing the transparent display 23, and the second information capturing device 22 is configured to capture an external image of the transparent display 23 relative to the other side of the user.

The transparent display 23 is, for example, a see-through transparent display such as a thin film transistor liquid crystal display (TFT-LCD), a field sequential color display, an active matrix organic light emitting display (AMOLED), and an electrowetting display. In addition to including a transparent display panel that can be seen through and can display information, the transparent display 23 may also be integrated with a touch panel that can detect the user's touch operations to allow the user to interact with the displayed information. In an embodiment, the transparent display 23 may be a head-mounted transparent display, such as augmented reality (AR) glasses.

The storage device 24 may be any types of fixed or movable random access memory (RAM), read-only memory (ROM), or flash memory, a similar device, or a combination of the above devices. In the embodiment, the storage device 24 is configured to store image data captured by the first information capturing device 21 and the second information capturing device 22, and record programs or commands that may be accessed and executed by the processor 25.

The processor 25 is, for example, a central processing unit (CPU), or another programmable microprocessor, digital signal processor (DSP), programmable controller, application specific integrated circuit (ASIC), or programmable logic device (PLD) for general or specific purposes, another similar device, or a combination of the above devices. The processor 25 is coupled to the first information capturing device 21, the second information capturing device 22, the transparent display 23, and the storage device 24 and may, for example, load the program commands from the storage device 24 to perform the method for displaying information of multiple objects of an embodiment of the disclosure. In other embodiments, the apparatus 20 for displaying information of multiple objects may further include devices such as a communication module for communicating with an external device, an eye tracking device for tracking the eyeball of the user viewing the transparent display 23, etc., and the embodiment does not limit the types of such devices. Embodiments are provided below to describe the detailed steps of the method for displaying information of multiple objects of the disclosure.

Figure 3A:
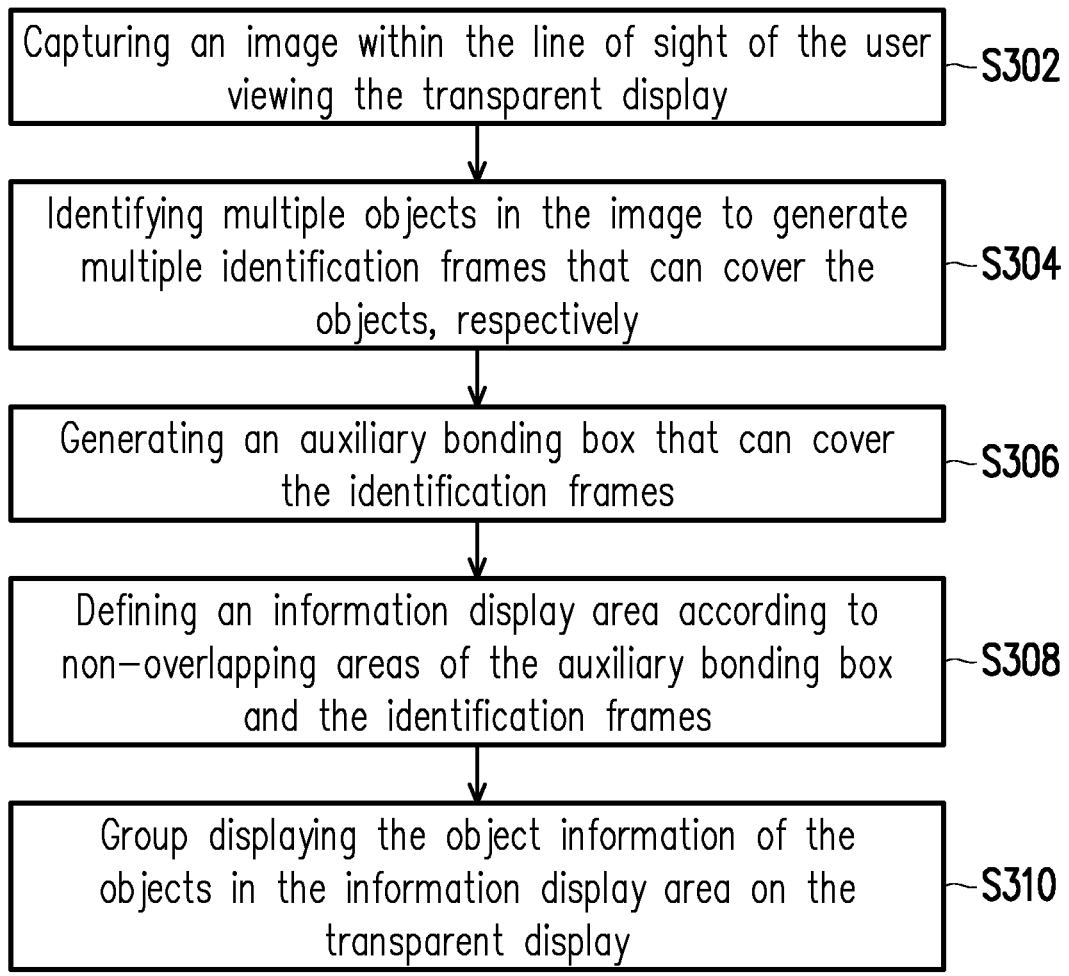
FIG. 3A is a flowchart of a method for displaying information of multiple objects according to an embodiment of the disclosure.

FIG. 3A is a flowchart of a method for displaying information of multiple objects according to an embodiment of the disclosure. Referring to FIG. 2 and FIG. 3A at the same time, the method of the embodiment may be adapted for the apparatus 20 for displaying information of multiple objects of FIG. 2. The detailed steps of the method for displaying information of multiple objects according to an embodiment of the disclosure are described below with reference to the elements in the apparatus 20 for displaying information of multiple objects.

First, the processor 25 captures an image within the sight of the user viewing the transparent display 23 (step S302). The processor 25, for example, determines the line of sight of the user viewing the transparent display 23 according to the internal image including the user captured by the first information capturing device 21, and captures an image located within the user's line of sight from the external image captured by the second information capturing device 22.

In an embodiment, the processor 25, for example, estimates the distance between the user and the transparent display 23 according to the area occupied by the user in the internal image and estimates the direction of view of the user according to the position and size of the user's body parts such as the face and eyes located in the internal image to determine a line of sight range of the user viewing the transparent display 23. In other embodiments, the processor 25 may also detect the angle of the user's eyeball by using the additionally disposed eye tracking device to determine the line of sight of the user viewing the transparent display 23. The embodiment does not limit the method for determining the line of sight range.

Next, the processor 25 identifies a plurality of objects in the image to generate a plurality of identification frames capable of covering the object, respectively (step S304). In an embodiment, the identification frame is, for example, a minimum rectangle that can cover the object. In other embodiments, the identification frame may also be defined by using areas of other shapes or sizes according to the requirements and is not limited herein.

Then, the processor 25 generates an auxiliary bonding box that can cover the identification frames (step S306). Similar to the identification frame, the auxiliary bonding box is, for example, a minimum rectangle or other polygons that can cover the identification frames but is not limited herein.

Afterwards, the processor 25 defines an information display area according to non-overlapping areas of the auxiliary bonding box and the identification frames (step S308). The processor 25, for example, searches for a plurality of areas in the auxiliary bonding box that are not overlapped with the identification frames (i.e., the non-overlapping areas or non-identification-frame areas) and selects therefrom an area suitable for group displaying object information of the objects.

Figure 3B:
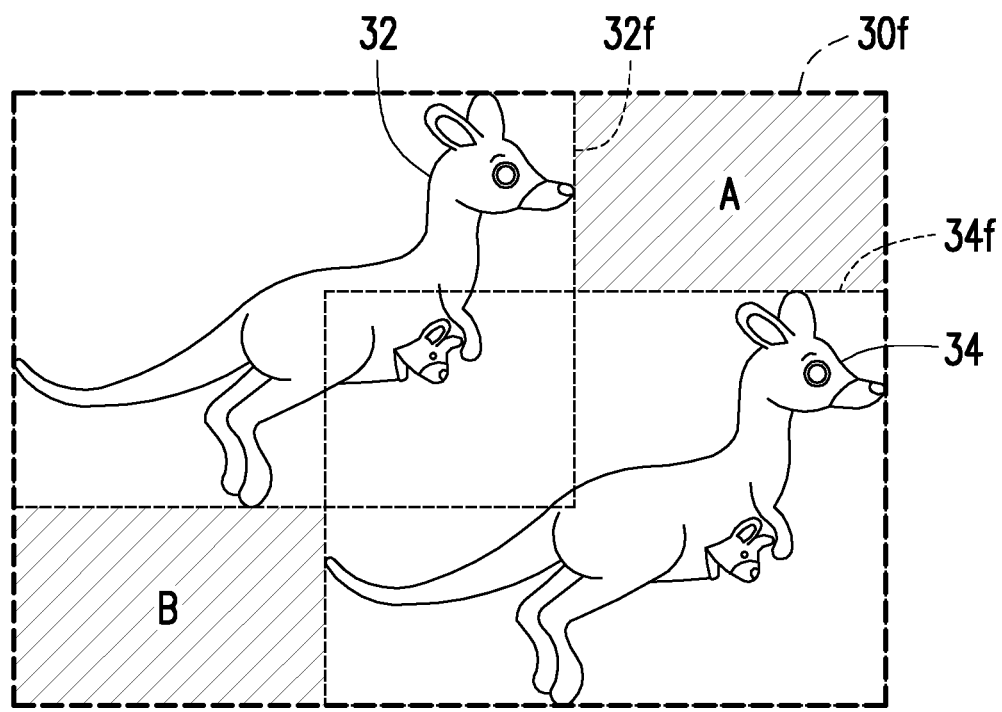
FIG. 3B is an example of the method for displaying information of multiple objects according to an embodiment of the disclosure.

For example, FIG. 3B is an example of the method for displaying information of multiple objects according to an embodiment of the disclosure. Referring to FIG. 3B, the apparatus of the embodiment, for example, identifies objects 32 and 34 from the image within the user's sight, generates identification frames 32*f* and 34*f* capable of covering the objects 32 and 34, respectively, and generates an auxiliary bonding box 30*f* capable of covering the identification frames 32*f* and 34*f*. The apparatus of the embodiment, for example, searches for areas A and B in the auxiliary bonding box 30*f* that are not overlapped with the identification frames 32*f* and 34*f* and may select one of the areas A and B as the information display area for group displaying the object information of the objects 32 and 34.

In some embodiments, the processor 25, for example, selects the area suitable for displaying the object information as the information display area according to conditions such as the distance between the user and the transparent display 23, the text size for displaying the object information in each area, the distribution of the objects in the auxiliary bonding box, the categories of the objects, and the moving speed of the objects. Implementations corresponding to the various conditions above will be described in detail in the embodiments below and are not described here.

Returning to the process of FIG. 3A, lastly, the processor 25 group displays the object information of the objects in the information display area on the transparent display 23 (step S310). In an embodiment, the object information of the objects is generated, for example, by integrating identification information of each object. The processor 25, for example, may perform object identification on the captured external image when the second information capturing device 22 captures the external image (before capturing image within the line of sight in step S302) to obtain the identification information of each object in the external image. Alternatively, the processor 25, for example, performs object identification when the objects in the image are identified in step S304 to obtain the identification information of each object. The embodiment does not limit the timing of performing object identification. In an embodiment, the object information of the objects is determined, for example, based on the common category of the objects and the text size presented when the common category is displayed in the information display area. When the objects are closer to each other or have a higher degree of overlap, the processor 25, for example, selects a common next upper-level sub-category of the main categories of the objects as the object information of the objects.

In the above embodiment, the processor 25 defines the auxiliary bonding box and the information display area with the identification frames that can cover the objects. In other embodiments, the processor 25 may also define the auxiliary bonding box and the information display area by using object contours as the identification frames. In other words, the processor 25 directly generates the auxiliary bonding box that can cover identification contours of the objects and defines the information display area and displays the object information of the objects according to the non-overlapping areas of the auxiliary bonding box and the identification contours. The embodiment does not limit the method for defining the auxiliary bonding box and the information display area.

Through the above method, the apparatus of the embodiment may define the information display area for displaying the object information around the objects and may group display the object information of the multiple objects in the information display area, which thereby optimizes the display information and improves reading comfort for the user.

[Determining the Information Display Area According to a Distribution of the Objects]

Figure 4A:
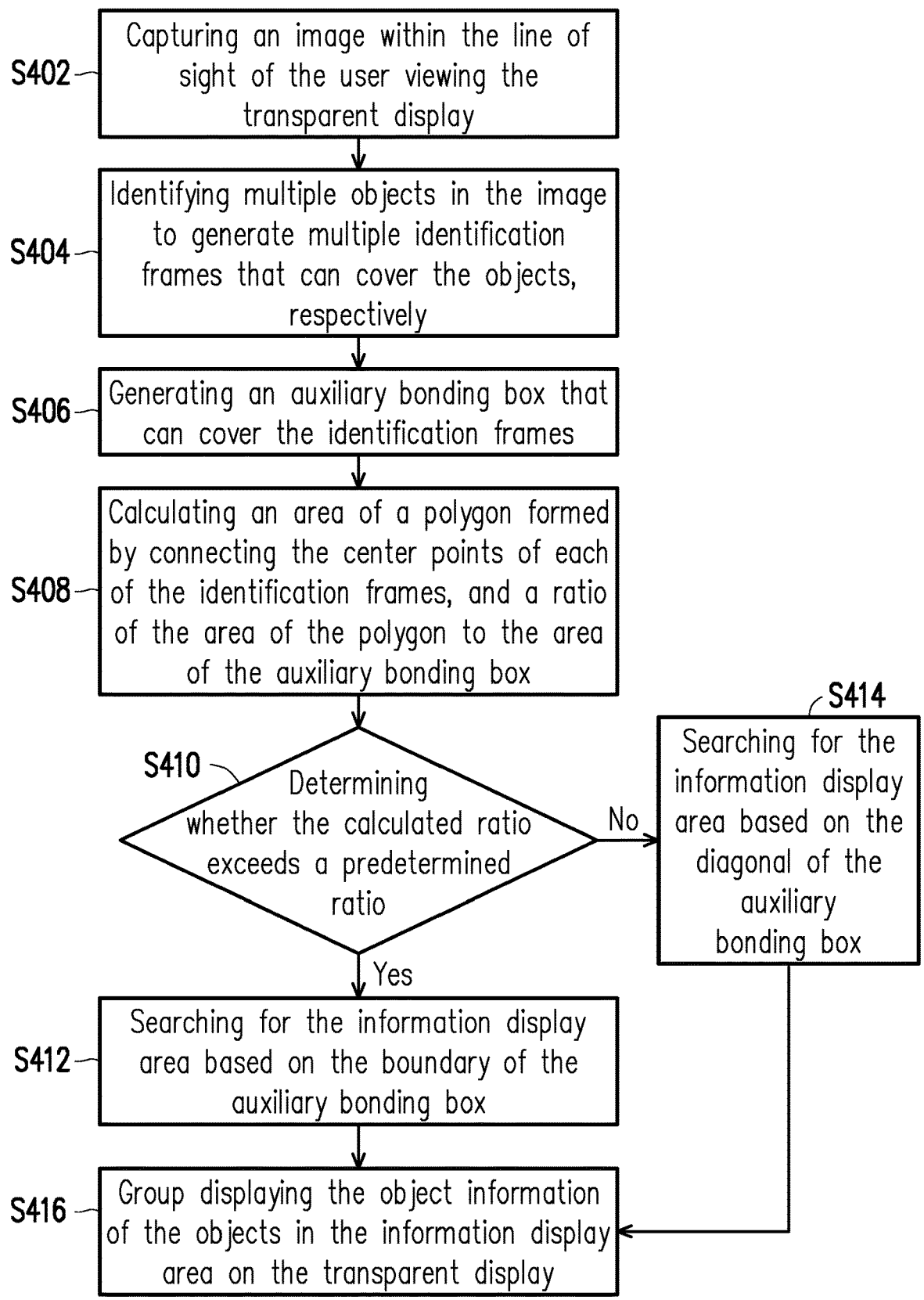
FIG. 4A is a flowchart of a method for displaying information of multiple objects according to an embodiment of the disclosure.

In an embodiment of the disclosure, the information display area may be determined according to the distribution of the objects. FIG. 4A is a flowchart of a method for displaying information of multiple objects according to an embodiment of the disclosure. Referring to FIG. 2 and FIG. 4A at the same time, the method of the embodiment may be adapted for the apparatus 20 for displaying information of multiple objects of FIG. 2 and includes steps as follows.

First, the processor 25 captures an image within the line of sight of the user viewing the transparent display 23 (step S402), identifies a plurality of objects in the image to generate a plurality of identification frames that can respectively cover the objects (step S404), and generates an auxiliary bonding box that can cover the identification frames (step S406). The above steps S402 to S406 are the same as or similar to steps S302 to S306 of the above embodiment, and thus the details thereof are not described here again.

In the embodiment, when the processor 25 defines the information display area, the processor 25 may first calculate an area of a polygon formed by connecting the center points of each of the identification frames and a ratio of the area of the polygon to the area of the auxiliary bonding box (step S408), and determine whether the calculated ratio exceeds a predetermined ratio (step S410).

If the ratio exceeds the predetermined ratio, the processor 25 searches for the information display area based on the boundary of the auxiliary bonding box (step S412). Otherwise, the processor 25 searches for the information display area based on the diagonal of the auxiliary bonding box (step S414). Lastly, the processor 25 group displays object information of the objects in the information display area on the transparent display 23 (step S416).

Figure 4B:
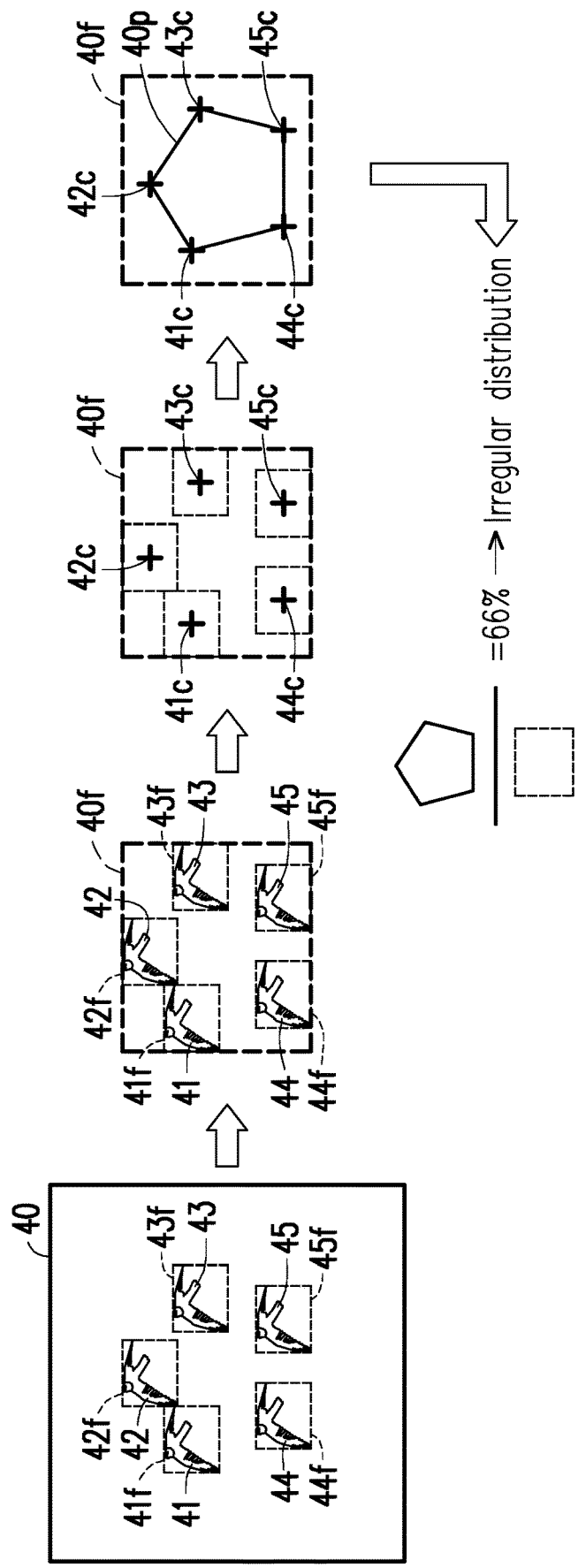
FIG. 4B is a schematic diagram of determination on a distribution of objects according to an embodiment of the disclosure.

For example, FIG. 4B is a schematic diagram of determining a distribution of objects according to an embodiment of the disclosure. The embodiment illustrates how to determine whether the distribution of the objects is regular or irregular. First, multiple objects 41 to 45 in an image 40 within the user's line of sight are identified to generate identification frames 41f to 45f capable of covering the objects 41 to 45, respectively. Next, an auxiliary bonding box 40f that can cover the identification frames 41f to 45f is generated. Then, centers 41c to 45c of the respective identification frames 41f to 45f are found, and the centers 41c to 45c of the respective identification frames 41f to 45f are connected to form a polygon 40p. Lastly, a ratio (e.g., 66%) of the area of the polygon 40p to the area of the auxiliary bonding box 40f is calculated. Based on the fact that the ratio exceeds the predetermined ratio (e.g., 40% to 60%; 50% is adopted in the embodiment as an example), finally the objects are determined to be irregularly distributed. In the case where the objects are irregularly distributed, the processor 25 searches for the information display area based on the boundary of the auxiliary bonding box.

Figure 4C:
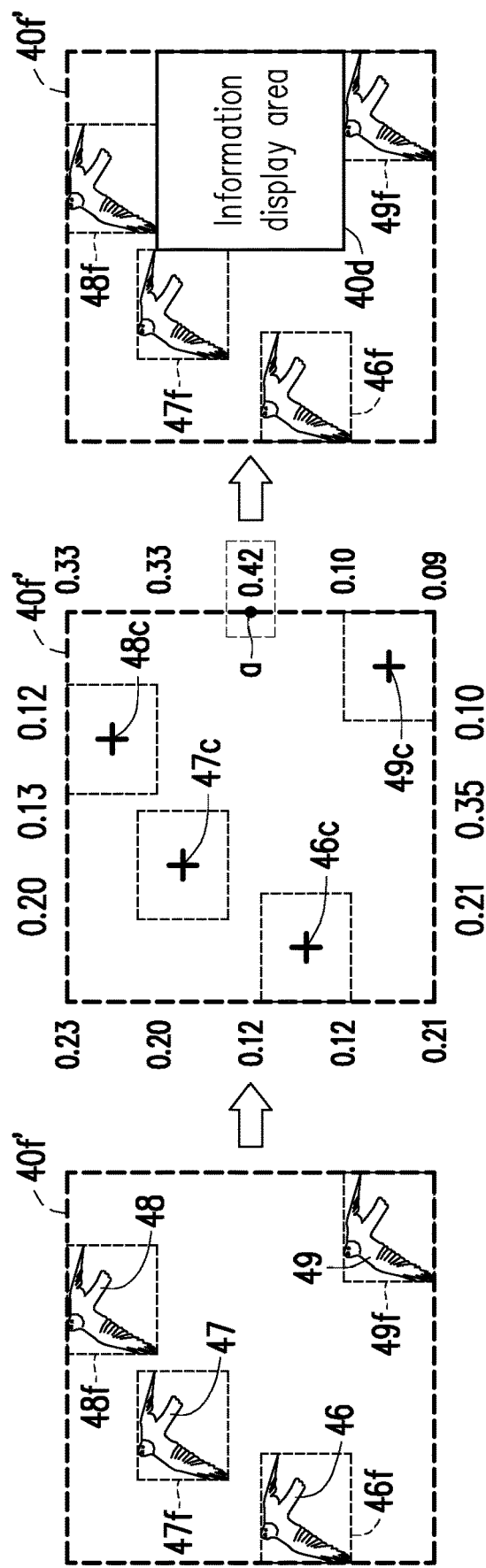
FIG. 4C is a schematic diagram of definition of an information display area according to a distribution of objects according to an embodiment of the disclosure.

For example, FIG. 4C is a schematic diagram of defining an information display area according to a distribution of objects according to an embodiment of the disclosure. The embodiment illustrates how to calculate an optimized information display area in the case where the distribution of the objects is irregular. First, identification frames 46f to 49f that can cover objects 46 to 49 respectively are generated, and an auxiliary bonding box 40f' capable of covering the identification frames 46f to 49f is generated. Then, minimum distance values (e.g., the values indicated on the boundary of the auxiliary bonding box 40f) from each point on the boundary of the auxiliary bonding box 40f to centers 46c to 49c of the identification frames are calculated. Finally, based on a point (i.e., a point a corresponding to the maximum value of 0.42 among the minimum distance values) on the boundary farthest from the center 46c to 49c of the identification frames, an area 40d adjacent to a point a in the non-overlapping areas of the auxiliary bonding box 40f is searched for as the information display area.

[Expanding the Information Display Area 1]

In an embodiment of the disclosure, the above information display area may be expanded to adjacent non-overlapping areas. In other words, in addition to the rectangular shape of the above embodiment, the information display area may also be any shape formed by combining a plurality of overlapping areas. For example, when the areas are rectangular and the number is 2, the overlapping area of the two rectangles may be divided by the area occupied by the two rectangles to define a region of interest (ROI) value. When the ROI value is less than a predetermined threshold, it may be determined that it would be difficult for the user to read if the two rectangles are combined for displaying information, and at this time, the two rectangles are not combined as the information display area. Otherwise, the two rectangular areas may be combined to expand the information display area.

Figure 5A:
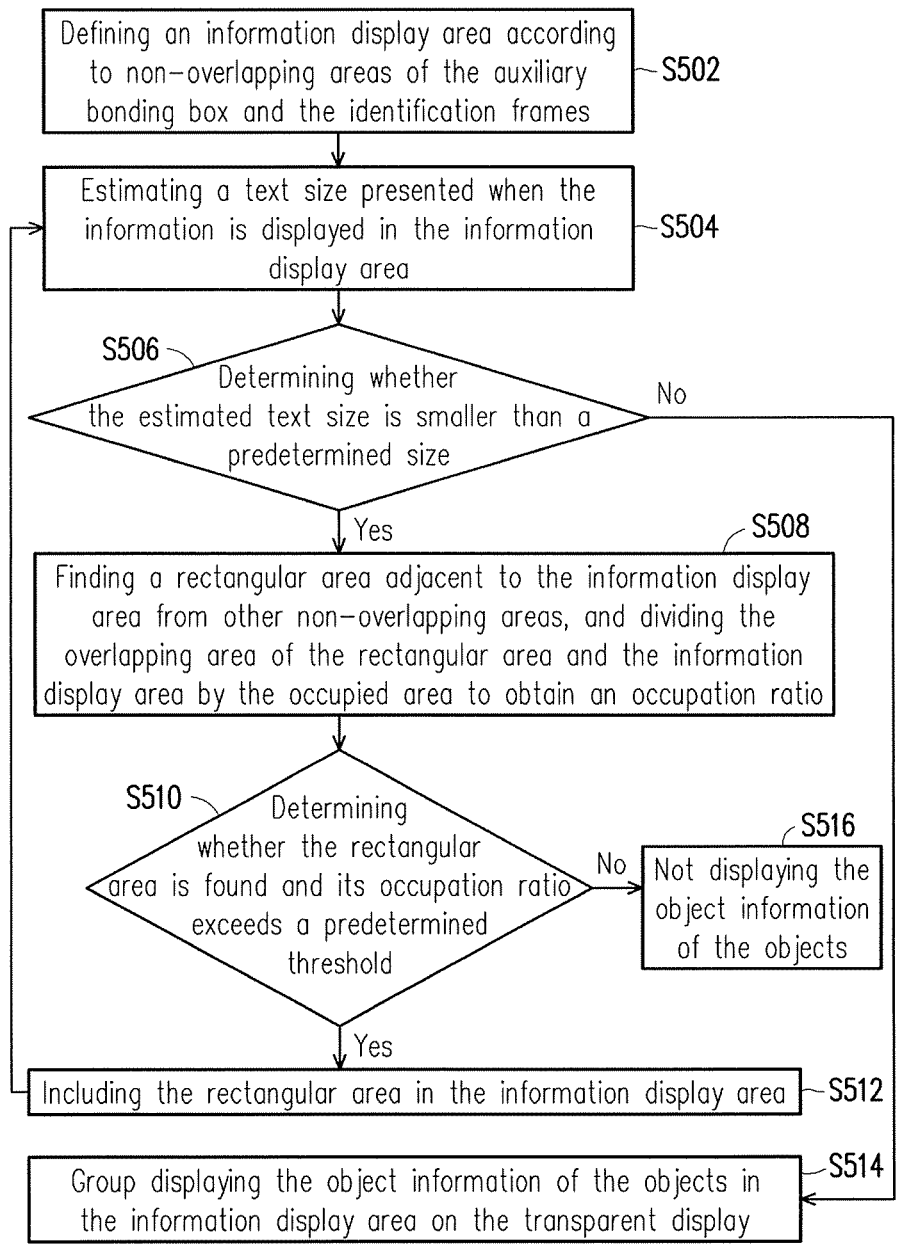
FIG. 5A is a flowchart of a method for displaying information of multiple objects according to an embodiment of the disclosure.

FIG. 5A is a flowchart of a method for displaying information of multiple objects according to an embodiment of the disclosure. Referring to FIG. 2 and FIG. 5A at the same time, the method of the embodiment may be adapted for the apparatus 20 for displaying information of multiple objects of FIG. 2 and subsequent to step S306 of FIG. 3A, the steps are as follows.

First, the processor 25 performs steps S302 to S306 of FIG. 3A to generate identification frames of objects and an auxiliary bonding box to thereby define an information display area according to non-overlapping areas of the auxiliary bonding box and the identification frames (step S502).

In the embodiment, after defining the information display area, the processor 25 estimates a text size presented when the object information is displayed in the information display area (step S504), and determines whether the text size is smaller than a predetermined size (step S506). The processor 25, for example, calculates a size of the defined information display area and a word count of the object information to be displayed to thereby estimate the text size (which should be as large as possible) suitable for viewing by the user and may be used when the object information of the word count is displayed in the information display area. If the information display area is too small, or if the word count of the object information to be displayed is too large, the font of the text is inevitably reduced to ensure that all the text of the object information can be accommodated in the information display area. Once the text size is reduced to smaller than the minimum font (i.e., the predetermined size) suitable for viewing by the user, it can be determined that the current information display area is insufficient to display the object information, and it is necessary to appropriately expand the information display area to accommodate the object information.

Accordingly, in step S506, if it is determined that the text size is smaller than the predetermined size, the processor 25 finds a rectangular area adjacent to the information display area from other non-overlapping areas in the auxiliary bonding box, and divides the overlapping area of the rectangular area and the information display area by the area occupied by the rectangular area and the information display area to obtain an occupation ratio (step S508) to thereby determine whether the rectangular area is found and its occupation ratio exceeds a predetermined threshold (step S510).

If the rectangular area is found and the occupation ratio exceeds the predetermined threshold, the processor 25 will include the rectangular area in the information display area (step S512), and, return to step S504, re-estimates the text size presented when the object information is displayed in the (expanded) information display area to thereby determine whether the text size estimated at this time can satisfy the predetermined size. If it is determined that the estimated text size is still smaller than the predetermined size, the processor 25 will perform step S508 again to continue searching for other areas to be included in the information display area. Conversely, if the estimated text size exceeds (i.e., is not less than) the predetermined size, the processor 25 group displays the object information of the objects in the information display area (step S514).

On the other hand, if, in step S510, the processor 25 does not find the rectangular area, or finds the rectangular area but the occupation ratio does not exceed the predetermined threshold, because the information display area that can be found is insufficient to appropriately display the object information of the objects, the processor 25 does not display the object information of the objects at this time (step S516).

The processor 25, for example, starts searching for the rectangular area from the non-overlapping area that is closest to the current information display area and is adjacent to the information display area to expand the information display area. If the found rectangular area does not satisfy the above occupation ratio condition, or if the text size presented after the found rectangular area is included in the information display area still does not reach the predetermined size, the processor 25 then searches outward for other areas until no area can be found to satisfy the occupation ratio condition.

Figure 5B:
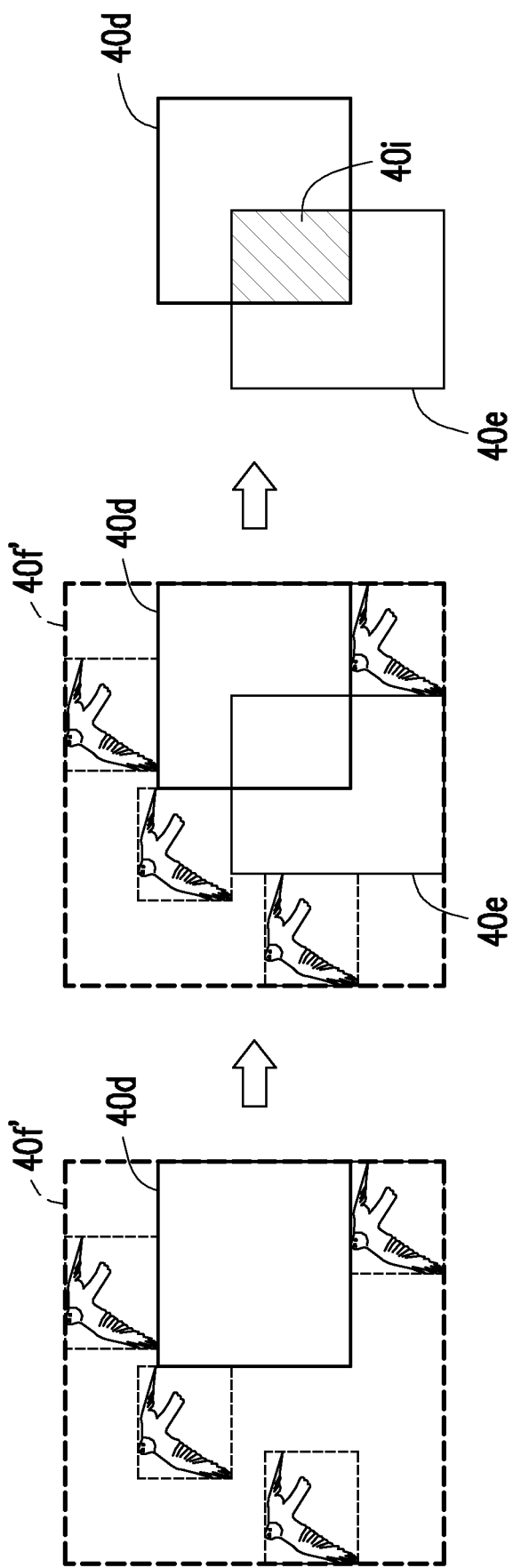
FIG. 5B is a schematic diagram of an expanded information display area according to an embodiment of the disclosure.

For example, FIG. 5B is a schematic diagram of an expanded information display area according to an embodiment of the disclosure. The embodiment is continued from the embodiment of FIG. 4C to illustrates how to expand the information display area. First, regarding the information display area 40d found in FIG. 4C, assuming that the text size presented when the object information is displayed in this information display area 40d is smaller than the predetermined size, at this time, a rectangular area 40e adjacent to the information display area 40d is found from the non-overlapping areas other than the information display area 40d in the auxiliary bonding box 40f. Then, an overlapping area 40i of the two areas 40d and 40e is divided by the area occupied by the two areas 40d and 40e to obtain an occupation ratio (e.g., 0.7). According to the calculated occupation ratio (e.g., 0.7) exceeding the predetermined threshold (e.g., 0.3 to 0.6; 0.5 is adopted in the present embodiment as an example), the rectangular area 40e is included in 40d as the information display area. After the rectangular area 40e is included, it is checked again whether the text size presented when the object information is displayed in the information display area (the union area of the areas 40d and 40e) reaches the predetermined size, and it is determined whether to continue searching for other areas according to the check result.

[Expanding the Information Display Area 2]

In an embodiment of the disclosure, the above information display area may be expanded to identification frames of adjacent objects. In the above embodiment, the identification frame is defined as the minimum rectangle that can cover the object. However, in reality, many objects are skewed within the identification frames, so that blank areas are present in the identification frames. Accordingly, in order to expand the information display area, the embodiment considers the possibility of including the blank areas in the information display area.

Figure 6A:
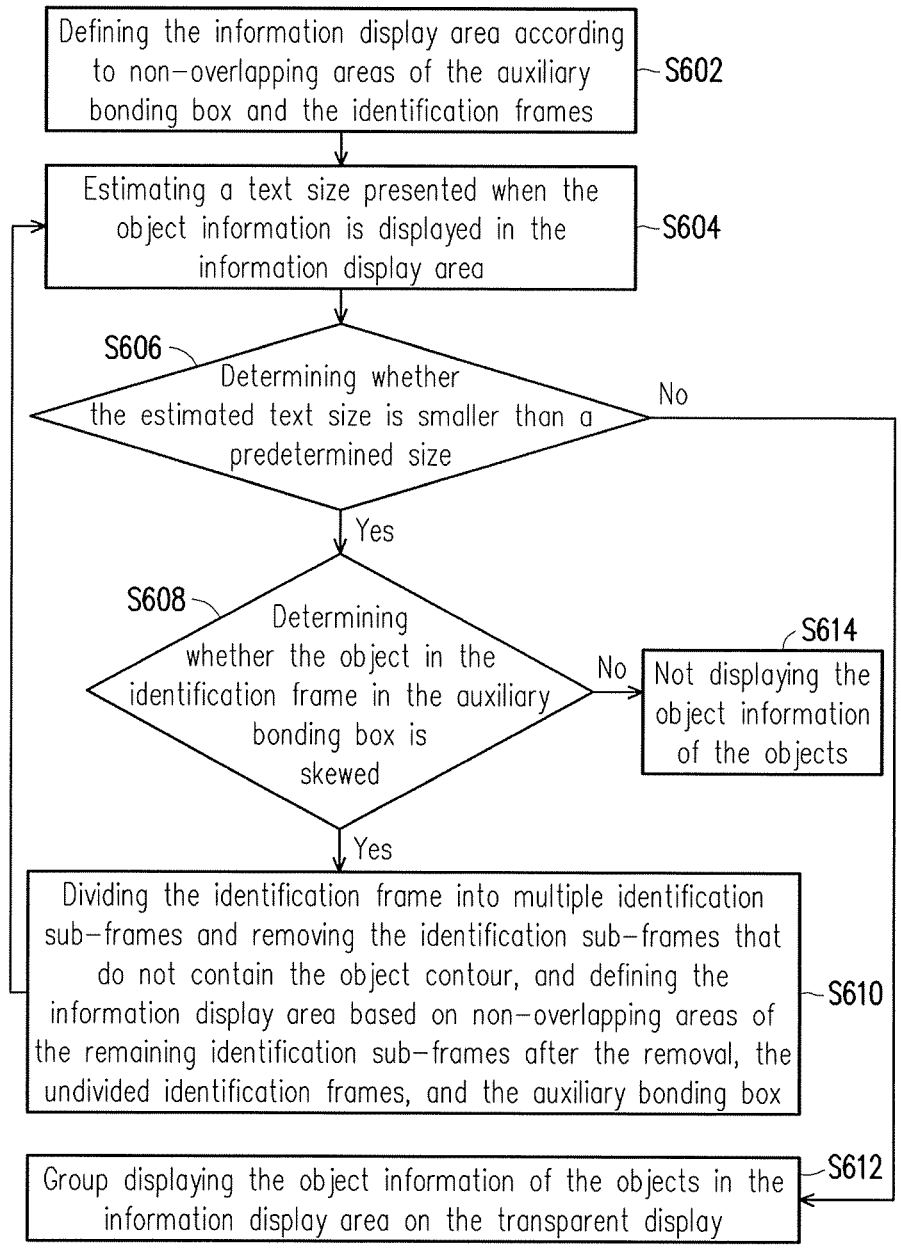
FIG. 6A is a flowchart of a method for displaying information of multiple objects according to an embodiment of the disclosure.

FIG. 6A is a flowchart of a method for displaying information of multiple objects according to an embodiment of the disclosure. Referring to FIG. 2 and FIG. 6A at the same time, the method of the embodiment may be adapted for the apparatus 20 for displaying information of multiple objects of FIG. 2, and includes steps subsequent to step S306 of FIG. 3 as follows.

First, the processor 25 performs steps S302 to S306 of FIG. 3A to generate identification frames of objects and an auxiliary bonding box to thereby define an information display area according to non-overlapping areas of the auxiliary bonding box and the identification frames (step S602). In the embodiment, after defining the information display area, the processor 25 estimates a text size presented when the object information is displayed in the information display area (step S604), and determines whether the text size is smaller than a predetermined size (step S606).

If it is determined that the estimated text size exceeds (i.e., is not less than) the predetermined size, the processor 25 group displays the object information of the objects in the currently defined information display area (step S612). If it is determined that the text size is smaller than the predetermined size, the processor 25 determines whether the object in the identification frame in the auxiliary bonding box is skewed (step S608). In the case where it is determined that the object in the identification frame is skewed, the processor 25 divides the identification frame into multiple identification sub-frames and removes the identification sub-frames that do not contain the object contour. The information display area is re-defined based on non-overlapping areas of the remaining identification sub-frames after the removal, the undivided identification frames, and the auxiliary bonding box (step S610). Then, returning to step S604, the processor 25 re-estimates the text size presented when the object information is displayed in the (re-defined) information display area to thereby determine whether the estimated text size at this time can satisfy the predetermined size.

If the processor 25 determines that the re-estimated text size may exceed the predetermined size, the processor 25 group displays the object information of the objects in the information display area (step S612). Conversely, if the processor 25 determines that the re-estimated text size is still smaller than the predetermined size, the processor 25 continues to determine whether there are other objects in the identification frames in the auxiliary bonding box that are skewed. If no other objects in the identification frames are skewed, since the current information display area is insufficient to appropriately display the object information of the objects, the processor 25 does not display the object information of the objects (step S614).

Figure 6B:
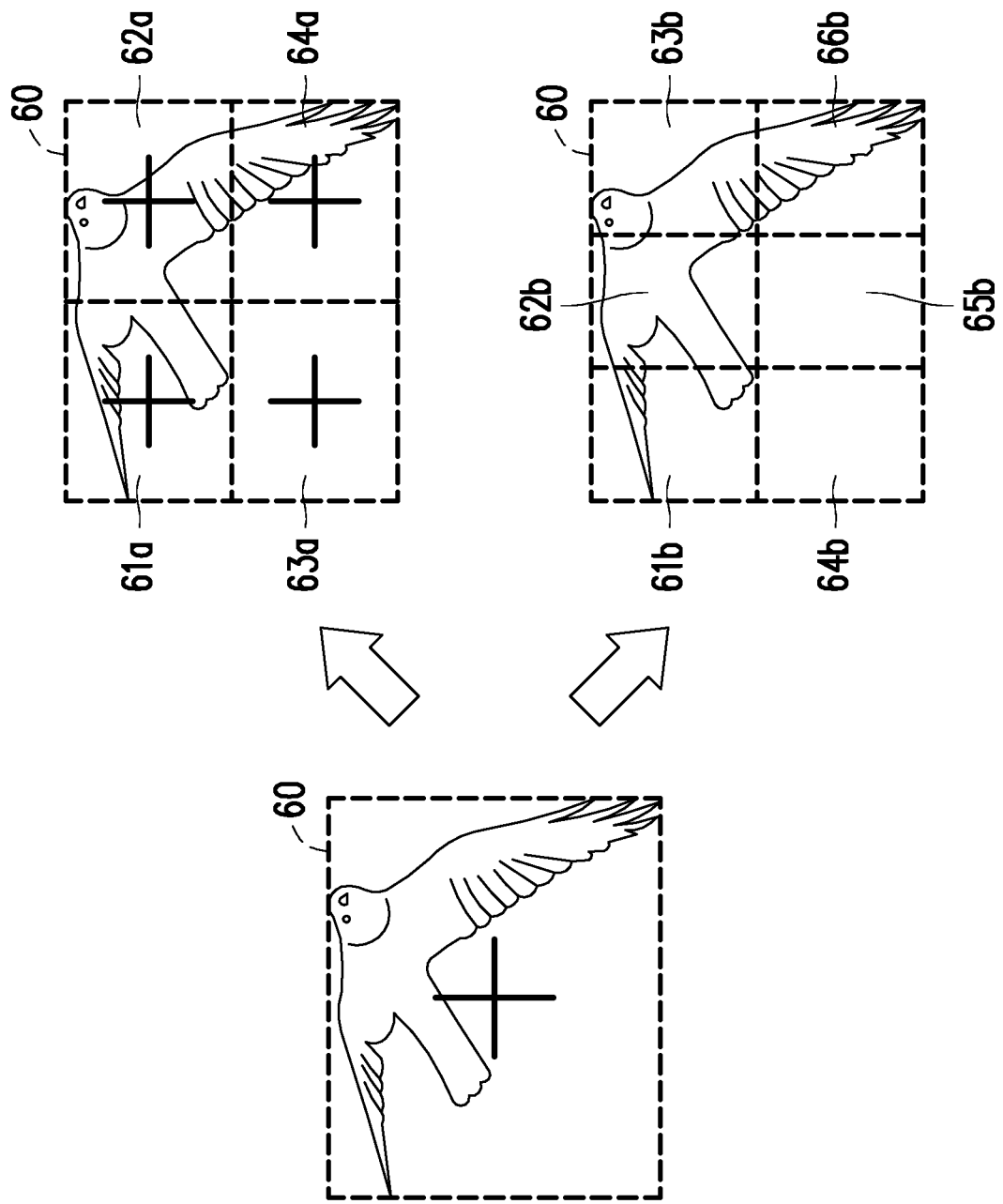
FIG. 6B is a schematic diagram of determining an object skew to reduce an identification frame according to an embodiment of the disclosure.

For example, FIG. 6B is a schematic diagram of determining an object skew to reduce an identification frame according to an embodiment of the disclosure. In the embodiment, after an object is identified to generate an identification frame 60, it is further determined whether a center point of the identification frame 60 is within the contour of the object to thereby determine whether the object is skewed. When the center point of the identification frame 60 is not within the contour of the object, the identification frame may be divided into multiple identification sub-frames to remove the identification sub-frame that does not contain the object contour. When the identification frame 60 is divided into 2*2 identification sub-frames 61a to 64a, by removing the identification sub-frame 63a, which does not contain the object contour, from the identification frame 60, so that the identification sub-frame 63a can be used as a part of the information display area for displaying the object information. On the other hand, when the identification frame 60 is divided into 2*3 identification sub-frames 61b to 66b, by removing the identification sub-frames 64b and 65b, which do not contain the object contour, from the identification frame 60, so that the identification sub-frames 64b and 65b can be used as a part of the information display area for displaying the object information.

Figure 6C:
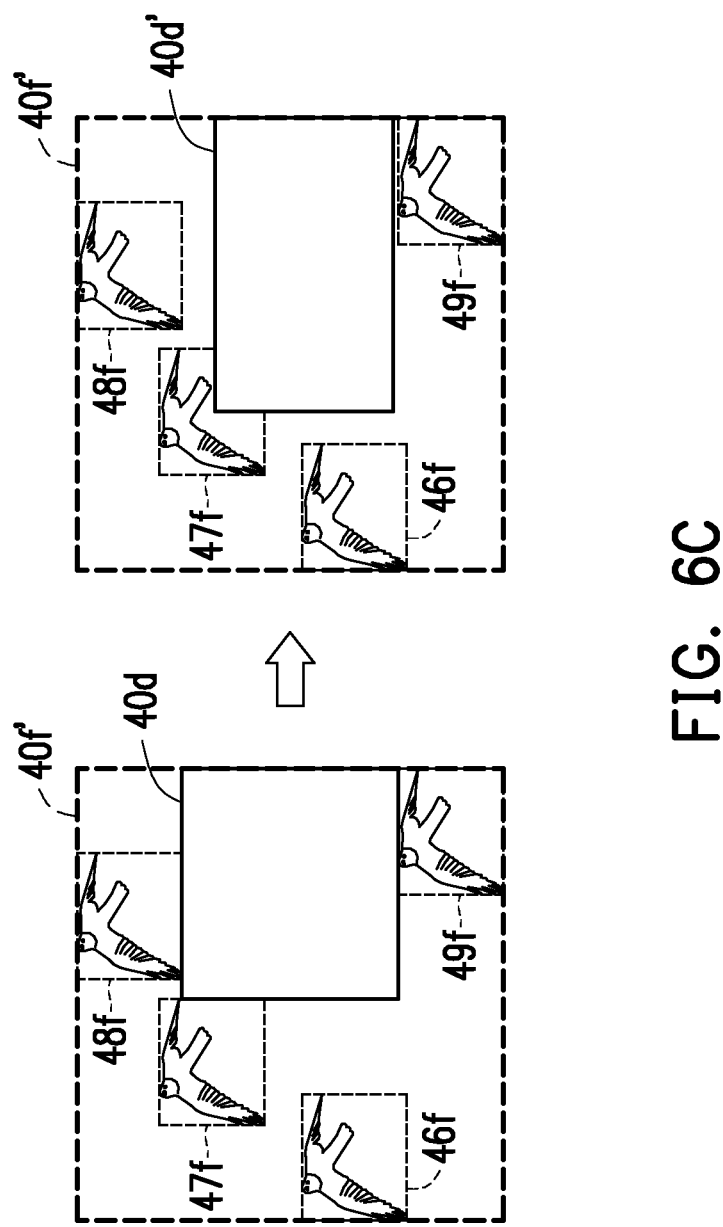
FIG. 6C is an example of the method for displaying information of multiple objects according to an embodiment of the disclosure.

FIG. 6C is an example of the method for displaying information of multiple objects according to an embodiment of the disclosure. The embodiment continues from the embodiment of FIG. 4C and illustrates how to expand the information display area. First, regarding the information display area 40d found in FIG. 4C, in the embodiment, a text size presented when the object information is displayed in the information display area 40d is first estimated, and it is determined whether the estimated text size is smaller than a predetermined size. If it is determined that the text size is smaller than the predetermined size, in the embodiment, it is determined whether the object in each identification frame in the auxiliary bonding box 40f is skewed. When the object in an identification frame 47f is found to be skewed, in the embodiment, the identification frame 47f is divided into multiple identification sub-frames according to the method disclosed in FIG. 6B, for example, and the identification sub-frame that does not contain the object contour is removed. Non-overlapping areas of the auxiliary bonding box are re-calculated based on the remaining identification sub-frames after the removal and the undivided identification frames to thereby define an information display area 40d'. By expanding the information display area 40d to the information display area 40d', in the embodiment, an expansion of the information display area can be realized, such that the text size presented when the object information is displayed in the information display area 40d' can reach the predetermined size.

[Group Displaying a Sub-Category of Objects]

In an embodiment of the disclosure, a next upper-level sub-category may be displayed for objects of different categories located in an image according to the degree of proximity of the objects or the text size of the displayed information. An identified object may have categories of more than one level (referred to as sub-categories). For example, dogs and cats may also be categorized as pets, but lions are beasts rather than pets. Pets and beasts are both animals, so they may belong to a sub-category of a different level.

In an embodiment, group displaying of the above sub-category may be based on the proximity or degree of overlapping between the objects, for example. The processor 25, for example, identifies objects in an image to obtain identification information of the objects and determines whether the objects have different main categories according to the identification information of the objects. If the objects do not have different main categories (i.e., they have the same main category), then the main category is used as the object information of the objects. Conversely, if the objects have different main categories, the processor 25 determines whether the distance between the objects of different main category is less than a predetermined distance. When the distance between the objects is less than the predetermined distance, the next upper-level sub-category of the main categories of the objects is selected as the object information. If the distance between the objects is not less than the predetermined distance, the respective main categories of the objects are retained as the object information to be displayed. In other embodiments, the processor 25 may also determine whether to use the next upper-level sub-category of the main categories of the objects as the object information according to the degree of overlapping between the objects. The embodiment is not limited to the implementation here.

In another embodiment, group displaying of the above sub-categories may be based on the text size of the object information presented in the information display area, for example. If the main categories of the objects are different but are mixed together, the common sub-category of the objects may be displayed. If the text presented when the common sub-category is displayed is too small, it may be considered to display a sub-category of an even higher level.

Figure 7:
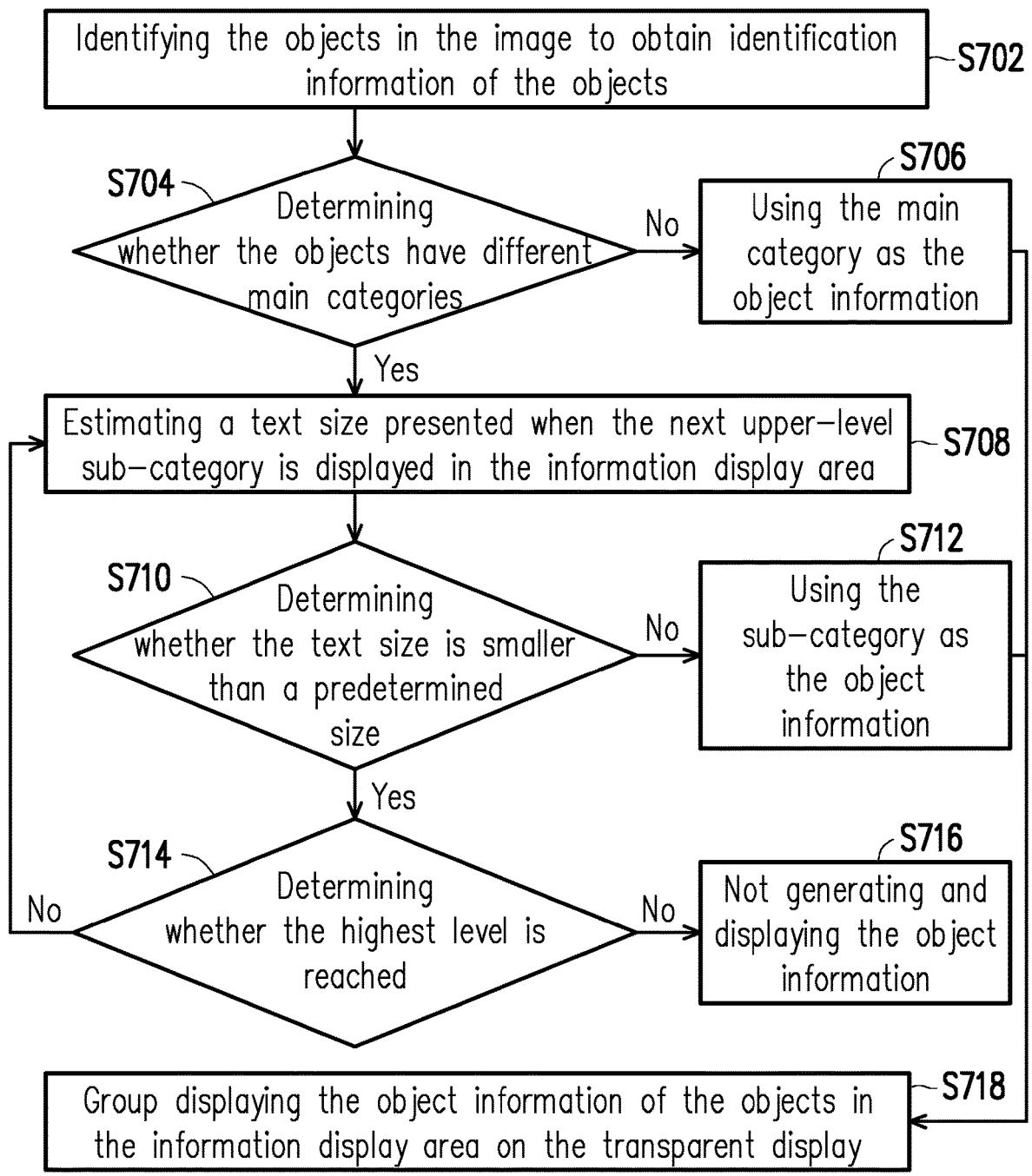
FIG. 7 is a flowchart of a method for displaying information of multiple objects according to an embodiment of the disclosure.

FIG. 7 is a flowchart of a method for displaying information of multiple objects according to an embodiment of the disclosure. Referring to FIG. 2 and FIG. 7 at the same time, the method of the embodiment may be adapted for the apparatus 20 for displaying information of multiple objects of FIG. 2, and includes steps subsequent to step S308 of FIG. 3A as follows.

First, the processor 25 performs steps S302 to S308 of FIG. 3A to generate identification frames of objects and an auxiliary bonding box, and define an information display area according to non-overlapping areas of the auxiliary bonding box and the identification frames.

In the embodiment, the processor 25 identifies the objects in the image to obtain identification information of the objects (step S702), and determines whether the objects have different main categories according to the identification information of the objects (step S704).

If the objects do not have different main categories (i.e., they have the same main category), the processor 25 uses the main category as the object information (step S706) and group displays the object information of the objects in the information display area on the transparent display 23 (step S718). Conversely, if the objects have different main categories, the processor 25 considers using a next upper-level sub-category of the main categories of the objects as the object information, estimates a text size presented when the sub-category is displayed in the information display area (step S708), and determines whether the text size is smaller than a predetermined size (step S710).

If the text size exceeds (i.e., is not smaller than) the predetermined size, the processor 25 uses the sub-category as the object information (step S712) and group displays the object information of the objects in the information display area on the transparent display 23 (step S718). Conversely, if the text size is smaller than the predetermined size, the processor 25 determines whether the highest level is reached (step S714).

If the highest level is not reached, the processor 25 returns to step S708 and repeats steps S708 to S714 to use a sub-category of an even higher level as the object information to estimate the text size presented when the sub-category is displayed in the information display area, and determines whether to use the sub-category as the object information. When the even upper level reaches the highest level, if the text size is still smaller than the predetermined size, the processor 25 does not generate and display the object information (step S716).

Through the above method, it is possible to display the suitable sub-category of the objects in the information display area.

[Displaying Object Information Outside an Auxiliary Bonding Box]

In the above embodiments, the object information is displayed in the auxiliary bonding box that can cover the identification frames of the objects. In the case where there are more objects and the distribution are tighter, the non-overlapping areas in the auxiliary bonding box may be too small to accommodate the object information of the objects. In this regard, in an embodiment of the disclosure, it may be determined whether the non-overlapping areas located in the auxiliary bonding box includes an area that can accommodate the object information of the objects. If an area that can accommodate the object information of the objects is not included, an adjacent area outside the auxiliary bonding box may be used as the information display area for displaying the object information.

[Determining a Display Method According to Sizes of Objects and a Display Word Count]

In an embodiment of the disclosure, the font size for displaying the object information is determined according to the object sizes of the identified objects and the word count of the object information to be displayed, and it is determined whether the object information is group displayed or not displayed according to the font size. The comfortable viewing size of the font may be, for example, 20' to 22', which is approximately equal to 0.33° to 0.37°. When the font size for individually displaying the object information of the objects is too small, in the embodiment, the object information of the objects may be group displayed. When the font size for group displaying the object information is still too small, it means that the group is too small. At this time, the object information may not be displayed in the embodiment.

Figure 8A:
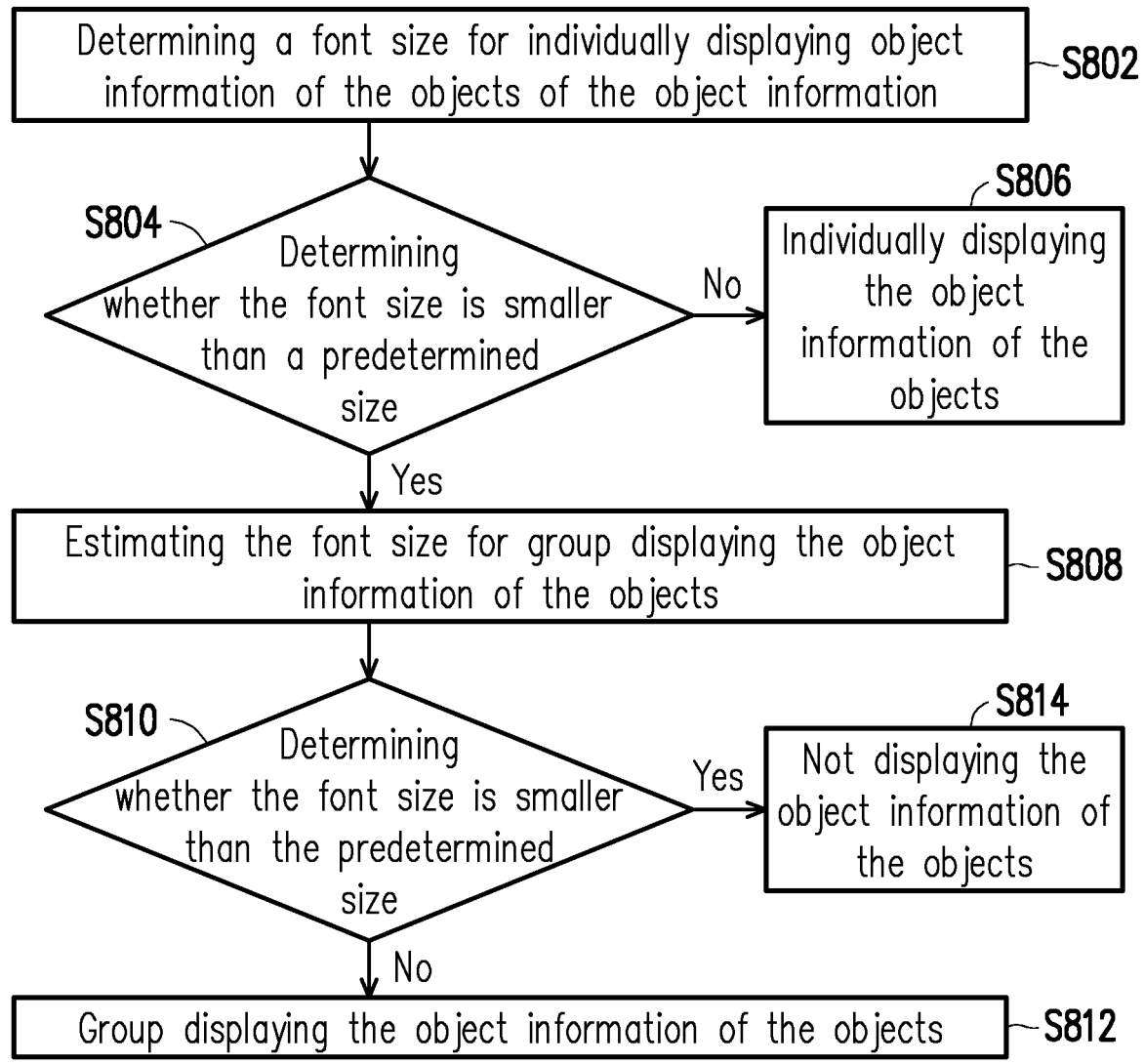
FIG. 8A is a flowchart of a method for displaying information of multiple objects according to an embodiment of the disclosure.

FIG. 8A is a flowchart of a method for displaying information of multiple objects according to an embodiment of the disclosure. Referring to FIG. 2 and FIG. 8A at the same time, the method of the embodiment may be adapted for the apparatus 20 for displaying information of multiple objects of FIG. 2 and includes steps as follows.

First, the processor 25 determines a font size for individually displaying object information according to a size of each object and a word count of the object information (step S802), and determines whether the determined font size is smaller than a predetermined size (step S804). The predetermined size is, for example, 0.35°. The processor 25, for example, identifies the objects in an image to generate identification frames capable of covering the objects, and then estimates the font size presented when the object information of each of the objects is displayed around the identification frames.

If the processor 25 determines that the determined font size exceeds (i.e., is not smaller than) the predetermined size, the object information of the objects is individually displayed (step S806). If the processor 25 determines that the determined font size is smaller than the predetermined size, a font size for group displaying the object information of the objects is estimated (step S808), and it is determined whether the estimated font size is smaller than the predetermined size (step S810). The processor 25, for example, defines an information display area through the method of the above embodiment to estimate the font size presented when the object information of the objects is displayed in the information display area.

If the estimated font size exceeds the predetermined size, the processor 25 group displays the object information of the objects (step S812). Conversely, if the estimated font size is smaller than the predetermined size, the processor 25 does not display the object information of the objects (step S814).

Figure 8C:
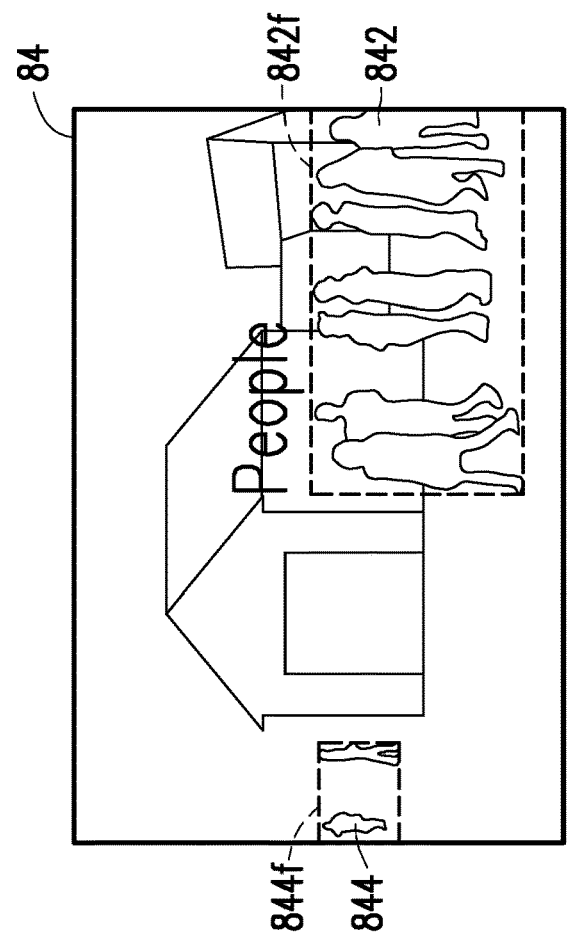
FIG. 8B and FIG. 8C are examples of group displaying information of multiple objects according to an embodiment of the disclosure.
Figure 8B:
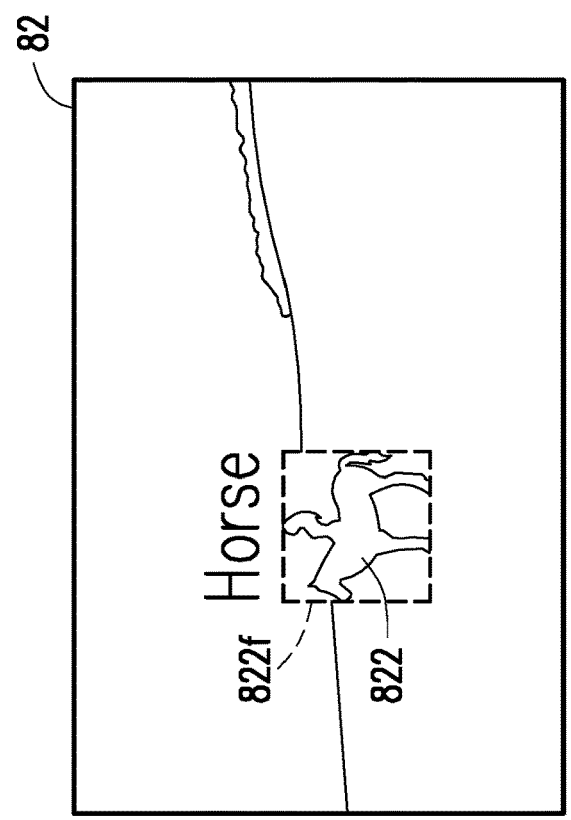

For example, FIG. 8B and FIG. 8C are diagrams of an example of group displaying information of multiple objects according to an embodiment of the disclosure. Referring to FIG. 8B first, an image 82 is an image within the sight of the user viewing the transparent display 23, and the image 82 includes a horse 822 located on a grassland. In the embodiment, an identification frame 822f capable of covering the horse 822 is generated, for example, by identifying the horse 822 in the image 82, and a font size presented when the object information (Horse) of the horse 822 is displayed above the identification frame 822f is then estimated. Since the font size presented when the object information (Horse) is displayed above the identification frame 822f already satisfies the comfortable viewing size of the font, in the embodiment, the object information displayed above the identification frame 822f is retained.

Next, referring to FIG. 8C, an image 84 is an image within the sight of the viewer viewing the transparent display 23, and the image 84 includes people 842 on the right and people 844 on the left. Regarding the people 842 on the right, in the embodiment, a font size presented when the object information (People) is displayed around each person is first estimated. Since each person is too small, the font size presented when the information is displayed around each person is too small, so group displaying is considered at this time. Accordingly, in the embodiment, an auxiliary bonding box 842f that can cover the people 842 on the right is generated, for example, through the method of the above embodiment. The non-overlapping areas in the auxiliary bonding box 842f are too small to accommodate the object information (People), so displaying outside the auxiliary bonding box 842f is considered. When the object information is displayed outside the auxiliary bonding box 842f, the font size can satisfy the comfortable viewing size. Therefore, in the embodiment, the object information is displayed outside the upper-left corner of the auxiliary bonding box 842f, for example.

On the other hand, regarding the people 844 on the left, if the object information is individually displayed for each person, the font size for displaying the information is similarly too small, so group displaying of the object information is considered. Accordingly, in the embodiment, an auxiliary bonding box 844f that can cover the people 844 on the left is generated, for example, through the method of the above embodiment. The non-overlapping areas in the auxiliary bonding box 844f are too small to accommodate the object information, so displaying outside the auxiliary bonding box 844f is considered. The auxiliary bonding box 844f itself is also small, and even if the object information is displayed outside the auxiliary bonding box 844f, the font size would also be too small. In this case, the object information is not displayed in the embodiment.

[Determining a Display Method According to Sizes of Objects, Moving Speed, and a Display Word Count]

An embodiment of the disclosure considers the fact that when the object is stationary, the comfortable viewing size of the font is, for example, 0.35°, and as the moving speed increases, the comfortable viewing size of the font also increases. When the speed continues to increase such that the comfortable viewing size of the font is larger than the font size for individual display, in the embodiment, the object information is group displayed. When the speed continues to increase such that the comfortable viewing size of the font is also larger than the font size for group display, it means that the speed is too fast, and at this time, the object information is not displayed in the embodiment.

Figure 9A:
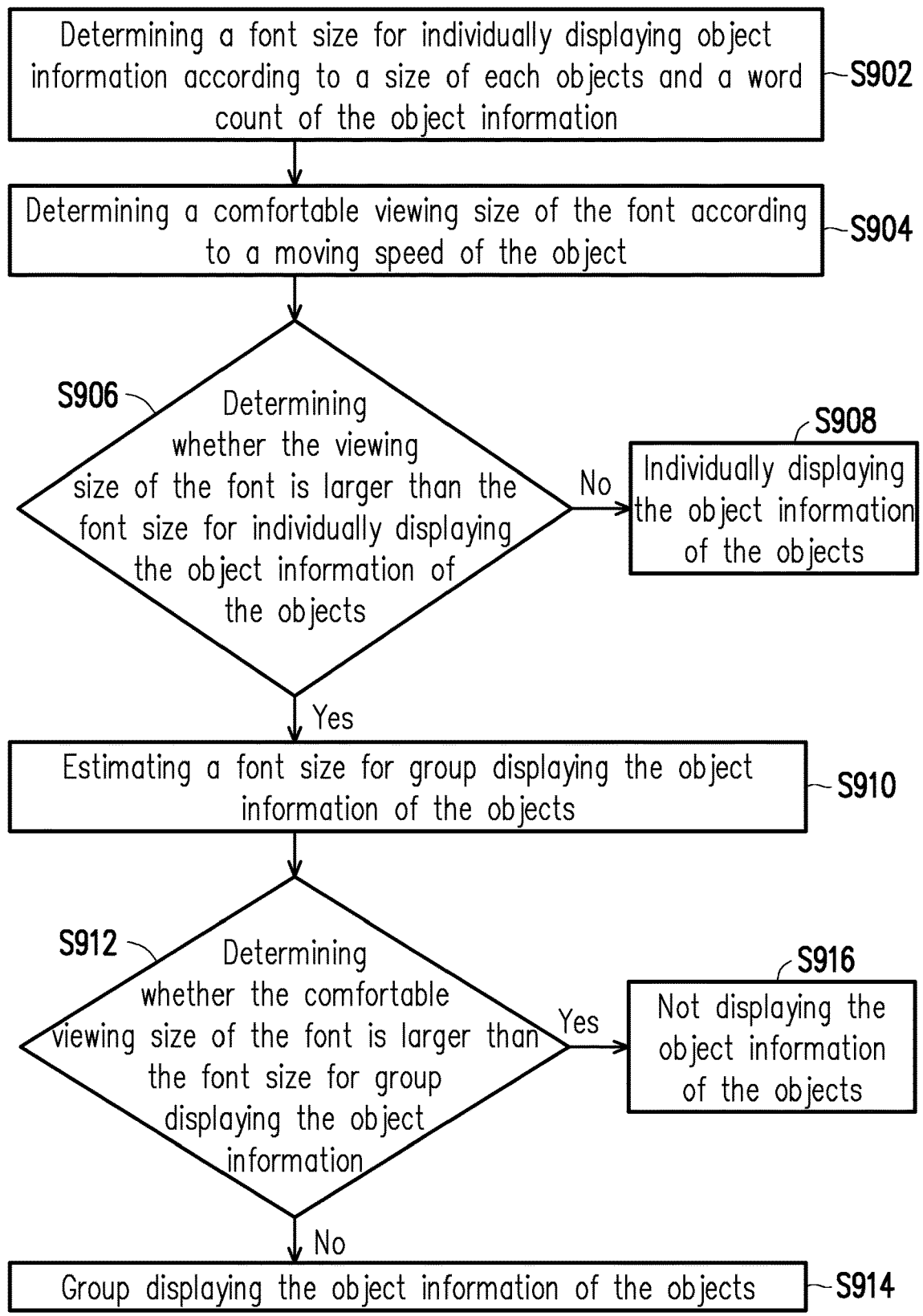
FIG. 9A is a flowchart of a method for displaying information of multiple objects according to an embodiment of the disclosure.

FIG. 9A is a flowchart of a method for displaying information of multiple objects according to an embodiment of the disclosure. Referring to FIG. 2 and FIG. 9A at the same time, the method of the embodiment may be adapted for the apparatus 20 for displaying information of multiple objects of FIG. 2 and includes steps as follows.

First, the processor 25 determines a font size for individually displaying object information according to a size of each object and a word count of the object information (step S902). The processor 25, for example, identifies the objects in an image to generate identification frames that can cover the objects, and then estimates the font size presented when the object information of the objects is displayed around the identification frames.

Next, the processor 25 determines a comfortable viewing size of the font according to a moving speed of the object (step S904), and determines whether the determined viewing size of the font is larger than the font size for individually displaying the object information of the objects (step S906). The comfortable viewing size of the font is predetermined, for example, at 0.35° and increases as the moving speed of the object increases.

If the processor 25 determines that the comfortable viewing size of the font is not larger than the font size for individual display, the object information of the objects is individually displayed (step S908). If the comfortable viewing size of the font is larger than the font size for individual display, it means that the font size that is presented when the object information is individually displayed is not comfortable for the user. The processor 25 estimates a font size for group displaying the object information of the objects (step S910), and determines whether the comfortable viewing size of the font is larger than the font size for group displaying the object information (step S912).

If the comfortable viewing size of the font is not larger than the font size for group displaying the object information, the processor 25 group displays the object information of the objects (step S914). Conversely, if the comfortable viewing size of the font is larger than the font size for group displaying the object information, the processor 25 does not display the object information of the objects (step S916).

Figure 9B:
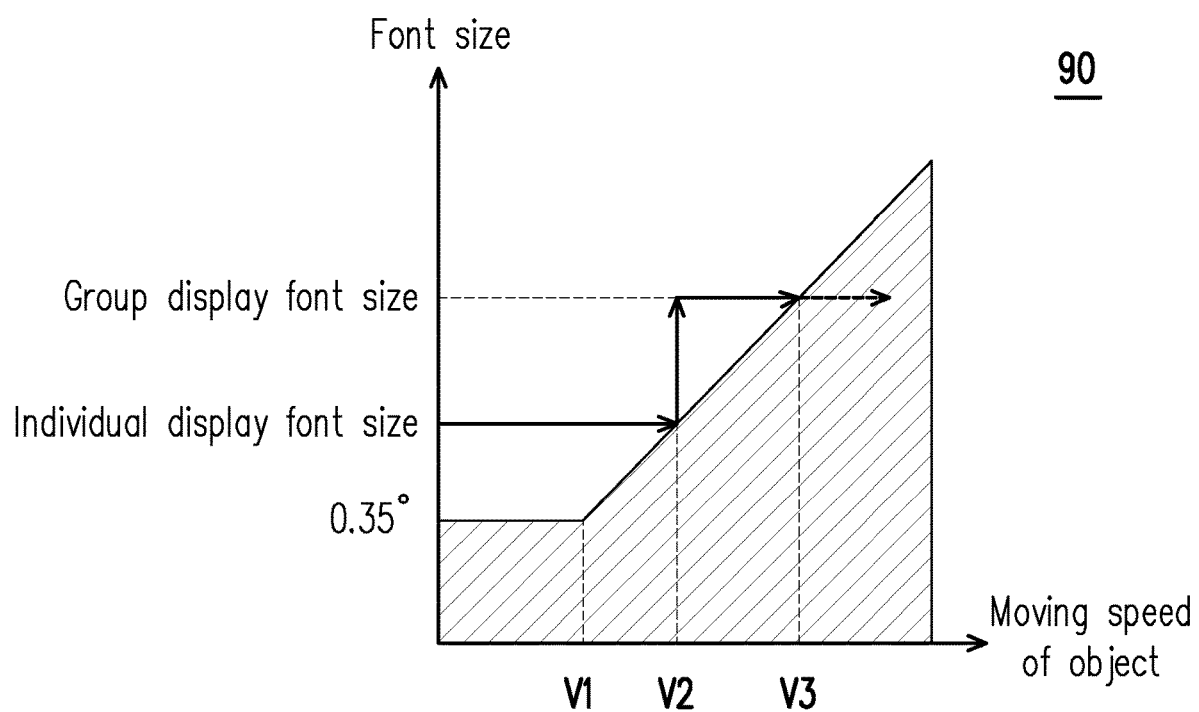
FIG. 9B is a diagram showing the relationship between a moving speed of an object and a comfortable font size according to an embodiment of the disclosure.

For example, FIG. 9B is a relationship diagram of a moving speed of an object and a comfortable font size according to an embodiment of the disclosure. Referring to FIG. 9B, the horizontal axis of a relationship diagram 90 of the embodiment represents the moving speed of the object, the vertical axis represents the font size, and the hatched area represents an area that would cause discomfort for the user to view. When the displayed font is English, the slope ratio of the above discomfort area is, for example, font size/0.055 seconds; when the displayed font is Chinese, the slope ratio of the above discomfort area is, for example, font size/0.24 seconds.

When the moving speed of the object is in the range of 0 to V1, the comfortable viewing size of the font is, for example, 0.35°. And after V1, the comfortable viewing size of the font increases as the moving speed of the object increases. When the moving speed of the object exceeds V2, the comfortable viewing size of the font exceeds the font size for individually displaying the object information. At this time, group displaying is adopted so that the font size for displaying the object information can satisfy the comfortable viewing size of the font. When the moving speed of the object exceeds V3, the comfortable viewing size of the font exceeds the font size for group displaying the object information. At this time, since group displaying the object information still causes discomfort, the object information is not displayed.

In an embodiment, when the moving speed of the object decreases such that the comfortable viewing size of the font is smaller than the font size for individual display, it is possible that group displaying is not canceled immediately, but group displaying is canceled after a delay of time, or group displaying is canceled when the speed of the object further decreases. Accordingly, it is possible to avoid frequently switching the display information when the speed is around the threshold value and thus causing image flickering and discomfort.

[Information Update Prompt Box]

An embodiment of the disclosure considers the timing of information update. For example, an information update prompt box is defined according to the sight of the user viewing the transparent display 23, so that when an identified object moves out of the information update prompt box, display of its object information is stopped. When a new object contacts or enters the information update prompt box, identification of the object is performed again, and group display of the object information of the object and the other objects in the image is performed again.

In an embodiment, the auxiliary bonding box of the objects may be expanded outward by a predetermined number of pixels as the information update prompt box. When a new object contacts the information update prompt box, identification and group display are performed again.

In an embodiment, the screen of the transparent display 23 may also be divided into multiple small areas, and the boundary of each area may be used as the information update prompt box. Similarly, when a new object contacts any of the information update prompt boxes, identification and group display are performed again.

Other Embodiments

In an embodiment, when the objects in the auxiliary bonding box are too small, the object information of individual objects is not displayed, but group display is adopted. The apparatus 20 for displaying information of multiple objects of the embodiment, for example, calculates a ratio of the area of each object in the auxiliary bonding box to the area of the auxiliary bonding box, and determines whether the calculated ratio is less than a predetermined ratio to thereby group display the object information of the object of which the ratio is less than the predetermined ratio.

In an embodiment, the apparatus 20 for displaying information of multiple objects, for example, uses the first information capturing device 21 to detect a relative position between the user and the transparent display 23 to thereby estimate a text size of the object information viewed by the user when the object information of the object is individually displayed according to the relative position, and determine whether the text size is smaller than a predetermined size. If it is determined that the text size is smaller than the predetermined size, the apparatus 20 for displaying information of multiple objects defines the information display area according to the method of the above embodiments and group displays the object information of the objects.

In an embodiment, when the apparatus 20 for displaying information of multiple objects determines the object information of the objects to be group displayed according to the relative position between the user and the transparent display 23 as described above, the apparatus 20, for example, determines whether the objects in the auxiliary bonding box have different main categories. If they have different main categories, a text size at the time when the next upper-level sub-category is displayed in the information display area is estimated, and according to whether the text size is smaller than the predetermined size, the sub-category suitable for displaying in the information display area is determined to present the suitable sub-category in the transparent display 23.

In the above embodiment, if the objects in the auxiliary bonding box have the same main category, the apparatus 20 for displaying information of multiple objects displays the main category as the object information. The apparatus 20 for displaying information of multiple objects, for example, searches for an information display area according to the distribution of the objects in the auxiliary bonding box. For example, when the distribution of the objects is regular, the information display area may be searched for based on the diagonal of the auxiliary bonding box. When the distribution of the objects is irregular, the information display area may be searched for based on the boundary of the auxiliary bonding box. The above method for searching for the information display area has been described in detail in the above embodiments and shall not be repeatedly described here.

In the above embodiment, when the information display area is found, the apparatus 20 for displaying information of multiple objects, for example, estimates the text size presented when the object information is displayed in the information display area, and compares the estimated text size with the predetermined size to determine whether to display the object information. If the estimated text size is smaller than the predetermined size, the apparatus 20 for displaying information of multiple objects does not display the object information; otherwise, the object information is displayed on the transparent display 23.

In the above embodiment, when the estimated text size is smaller than the predetermined size, the apparatus 20 for displaying information of multiple objects, for example, further searches for a rectangular area adjacent to the information display area in the non-overlapping areas of the auxiliary bonding box, and determines whether to include the rectangular area in the information display area according to an occupation ratio of the overlapping area of the rectangular area and the information display area. After the rectangular area is included, the apparatus 20 for displaying information of multiple objects, for example, re-estimates the text size presented when the object information is displayed in the information display area to determine whether to display the object information.

In the above embodiment, when the estimated text size is smaller than the predetermined size, the apparatus 20 for displaying information of multiple objects, for example, further determines whether the object in each identification frame in the auxiliary bonding box is skewed to determine whether to divide the identification frame and remove the identification sub-frames that do not include the object contour, and re-defines the information display area and re-estimates the text size presented when the object information is displayed in this information display area to determine whether to display the object information.

The method and the apparatus for displaying information of multiple objects according to an embodiment of the disclosure may appropriately group display the object information of multiple objects according to conditions including the distance between the user and the transparent display, the sizes of the objects, the distribution of the objects, the moving speed of the objects, the categories of the objects, etc. to thereby avoid a disorderly image resulting from individual display. In addition, in an embodiment of the disclosure, the position and the size of the information display area may be defined according to the objects, and the position or coverage of the information display area is appropriately adjusted according to the text size presented when the object information is displayed therein, such that the user can view the object information in a more comfortable viewing size to improve the reading comfort of the user.

Although the disclosure has been disclosed as the embodiments above, the embodiments are not meant to limit the disclosure. Any person skilled in the art may make slight modifications and variations without departing from the spirit and scope of the disclosure. Therefore, the protection scope of the disclosure shall be defined by the claims attached below and their equivalents.

What is claimed is:

1. A multiple objects information display method, the method comprising steps below:
   capturing an image within a sight of a user viewing a transparent display;
   identifying a plurality of objects in the image to generate a plurality of identification frames each capable of covering a corresponding object of the plurality of objects, respectively;
   generating an auxiliary bonding box capable of covering the identification frames within the transparent display;
   defining an information display area within the auxiliary bonding box according to non-overlapping areas of the auxiliary bonding box and the plurality of identification frames; and
   group displaying object information of the plurality of objects in the information display area on the transparent display.

2. The method according to claim 1, wherein the step of capturing the image within the sight of the user viewing the transparent display comprises:
   capturing an internal image of the user by using a first information capturing device and determining the sight of the user viewing the transparent display according to the internal image; and
   capturing an external image of the transparent display on the other side with respect to the user by using a second information capturing device and capturing the image located within the sight from the external image.

3. The method according to claim 1, further comprising:
   identifying the plurality of objects to obtain identification information of each of the objects and integrating the identification information to generate the object information.

4. The method according to claim 3, wherein the step of integrating the identification information to generate the object information comprises:
   determining whether the plurality of objects comprise different main categories according to the identification information of each of the plurality of objects;
   if the plurality of objects comprise different main categories, determining whether a distance between the plurality of objects comprising different main categories is less than a predetermined distance; and
   if the distance between the plurality of objects is less than the predetermined distance, selecting a next upper-level sub-category of the main categories of the plurality of objects as the object information.

5. The method according to claim 3, wherein the step of integrating the identification information to generate the object information comprises:
   determining whether the plurality of objects comprise different main categories according to the identification information of each of the plurality of objects;
   if the plurality of objects comprise different main categories, estimating a text size for displaying a next upper-level sub-category of the main categories in the information display area, and determining whether the text size is smaller than a predetermined size;
   if the text size exceeds the predetermined size, using the next upper-level sub-category as the object information; and
   if the text size is smaller than the predetermined size, repeating the above step to estimate a text size for displaying a further next upper-level sub-category and determine whether the text size is smaller than the predetermined size, until the further next upper-level reaches a highest level, and if the text size is still smaller than the predetermined size, the object information is not generated.

6. The method according to claim 1, wherein the step of defining the information display area according to the non-overlapping areas of the auxiliary bonding box and the plurality of identification frames comprises:
   calculating an area of a polygon formed by connecting center points of each of the plurality of identification frames, and a ratio of the area of the polygon to an area of the auxiliary bonding box;

determining whether the ratio exceeds a predetermined ratio;

if the ratio exceeds the predetermined ratio, searching for the information display area based on a boundary of the auxiliary bonding box; and if the ratio does not exceed the predetermined ratio, searching for the information display area based on a diagonal of the auxiliary bonding box.

7. The method according to claim 6, wherein the step of searching for the information display area based on the boundary of the auxiliary bonding box comprises:

calculating minimum values of distances from each point on the boundary to the center points of each of the plurality of identification frames; and selecting a point area in adjacent non-overlapping areas corresponding to a maximum value among the minimum values as the information display area.

8. The method according to claim 1, wherein the step of group displaying the object information of the plurality of objects in the information display area on the transparent display further comprises:

estimating a text size presented when the object information is displayed in the information display area, and determining whether the text size is smaller than a predetermined size;

if the text size is smaller than the predetermined size, searching for at least one rectangular area adjacent to the information display area in the non-overlapping areas;

dividing an overlapping area of the rectangular area and the information display area by an occupied area of the rectangular area and the information display area to obtain an occupation ratio, and determining whether the occupation ratio exceeds a predetermined threshold; and if the occupation ratio exceeds the predetermined threshold, the rectangular area corresponding to the occupation ratio is included in the information display area.

9. The method according to claim 1, wherein the step of defining the information display area according to the non-overlapping areas of the auxiliary bonding box and the plurality of identification frames further comprises:

determining whether the object in each of the plurality of identification frames is skewed; and if the object is skewed, dividing the identification frame into a plurality of identification sub-frames, removing the identification sub-frames that do not comprise an object contour, and defining the information display area based on non-overlapping areas of the plurality of identification sub-frames remaining after the removal, the undivided identification frames, and the auxiliary bonding box.

10. The method according to claim 1, wherein the step of defining the information display area according to the non-overlapping areas of the auxiliary bonding box and the plurality of identification frames comprises:

determining whether the non-overlapping areas located in the auxiliary bonding box include an area capable of accommodating the object information of the plurality of objects; and if the area capable of accommodating the object information of the plurality of objects is not included, an area adjacent to the object outside the auxiliary bonding box is used as the information display area.

11. The method according to claim 1, wherein the step of group displaying the object information of the plurality of objects in the information display area on the transparent display comprises:

calculating a ratio of an area of each of the plurality of objects to an area of the auxiliary bonding box, and determining whether the calculated ratio is less than a predetermined ratio; and group displaying the object information of the object of which the calculated ratio is less than the predetermined ratio.

12. The method according to claim 1, wherein the step of group displaying the object information of the plurality of objects in the information display area on the transparent display comprises:

determining a font size for individually displaying the object information according to sizes of each of the plurality of objects and a word count of the object information, and determining whether the font size is smaller than a predetermined size;

if the font size is smaller than the predetermined size, group displaying the object information of the plurality of objects, and determining whether a font size for group displaying the object information is smaller than the predetermined size; and if the font size for group displaying the object information is smaller than the predetermined size, the object information of the plurality of objects is not displayed.

13. The method according to claim 1, wherein the step of group displaying the object information of the objects in the information display area on the transparent display comprises:

determining a font size for individually displaying the object information according to sizes of each of the plurality of objects and a word count of the object information;

determining a font viewing size according to a moving speed of the object, and determining whether the determined font viewing size is larger than the font size for individually displaying the object information of the plurality of objects;

if the font viewing size is larger than the font size of individual display, group displaying the object information of the plurality of objects, and determining whether the font viewing size is larger than a font size for group displaying the object information; and if the font viewing size is larger than the font size for group displaying the object information, the object information of the plurality of objects is not displayed.

14. The method according to claim 1, further comprising:

generating the auxiliary bonding box capable of covering contours of the plurality of objects based on the contours, and defining the information display area according to non-overlapping areas of the auxiliary bonding box and the contours to display the object information of the plurality of objects.

15. The method according to claim 1, further comprising:

defining an information update prompt box according to the sight of the user viewing the transparent display;

stopping display of the object information of the object when the identified object moves out of the information update prompt box; and when a new object contacts the information update prompt box, the new object is identified and object information of the new object and other objects is group displayed.

16. The method according to claim 1, wherein after the step of identifying the plurality of objects in the image to generate the identification frames, the method further comprises:

detecting a relative position between the user and the transparent display by using a first information capturing device;

estimating a text size of the object information viewed by the user when the object information of the plurality of objects is individually displayed according to the relative position, and determining whether the text size is smaller than a predetermined size; and if the text size is smaller than the predetermined size, defining the information display area and group displaying the object information of the plurality of objects.

17. A multiple objects information display apparatus, comprising:

a transparent display;

a first information capturing device, capturing an internal image comprising a user viewing the transparent display;

a second information capturing device, capturing an external image of the transparent display on the other side with respect to the user;

a storage device configured to store image data of the internal age and the external image captured by the first information capturing device and the second information capturing device and record a program or a command; and a processor, coupled to the transparent display, the first information capturing device, the second information capturing device, and the storage device, loading and executing the program or the command recorded in the storage device to:

determine a sight of the user viewing the transparent display according to the internal image and capture an image in the external image within the sight;

identify a plurality of objects in the image to generate a plurality of identification frames each capable of covering a corresponding object of the plurality of objects, respectively;

generate an auxiliary bonding box capable of covering the plurality of identification frames within the transparent display;

define an information display area within the auxiliary bonding box according to non-overlapping areas of the auxiliary bonding box and the plurality of identification frames; and group display object information of the plurality of objects in the information display area on the transparent display.

18. The multiple objects information display apparatus according to claim 17, wherein the processor further identifies the plurality of objects to obtain identification information of each of the plurality of objects and integrates the identification information to generate the object information.

19. The multiple objects information display apparatus according to claim 18, wherein the processor further comprises:

determine whether the plurality of objects comprise different main categories according to the identification information of each of the plurality of objects;

if the plurality of objects comprise different main categories, estimate a text size for displaying a next upper-level sub-category of the main categories in the information display area, and determine whether the text size is smaller than a predetermined size;

if the text size exceeds the predetermined size, use the next upper-level sub-category as the object information; and if the text size is smaller than the predetermined size, repeat the above step to estimate a text size for displaying a further next upper-level sub-category and determine whether the text size is smaller than the predetermined size, until the further next upper-level reaches a highest level, and if the text size is still smaller than the predetermined size, the object information is not generated.

20. The multiple objects information display apparatus according to claim 17, wherein the processor further comprises:

detect a relative position between the user and the transparent display by using the first information capturing device;

estimate a text size of the individual object information of the plurality of objects viewed by the user according to the relative position, and determine whether the text size is smaller than a predetermined size; and if the text size is smaller than the predetermined size, define the information display area and group display the object information of the plurality of objects.

* * * * *